US007869895B2

(12) United States Patent  
Jones

(10) Patent No.: US 7,869,895 B2  
(45) Date of Patent: Jan. 11, 2011

(54) SYSTEM, METHOD, AND COMPUTER PROGRAM PRODUCT FOR COMPUTING ORIENTATION ALIGNMENT TRANSFER TOOL LOCATIONS TO TRANSFER PREDICTED CRUISE ORIENTATION ALIGNMENT OF AN AS-BUILT AIRPLANE

(75) Inventor: Alan K. Jones, Seattle, WA (US)

(73) Assignee: The Boeing Company, Chicago, IL (US)

( * ) Notice: Subject to any disclaimer, the term of this patent is extended or adjusted under 35 U.S.C. 154(b) by 418 days.

(21) Appl. No.: 12/002,078

(22) Filed: Dec. 13, 2007

(65) Prior Publication Data

US 2009/0151143 A1 Jun. 18, 2009

(51) Int. Cl.
G06F 19/00 (2006.01)
B23B 5/28 (2006.01)
G01P 21/00 (2006.01)
(52) U.S. Cl. .................... 700/114; 700/64; 700/192; 700/195; 29/407.09; 73/1.38
(58) Field of Classification Search .............. 700/95, 700/117, 159, 186, 192–195, 64, 114; 244/3.21, 244/45 R, 46, 118.1, 117 R, 119; 701/1, 701/3–5, 6, 7; 703/7, 8; 29/407.1, 714, 407.09; 89/41.19
See application file for complete search history.

(56) References Cited

U.S. PATENT DOCUMENTS 4,303,978 A 12/1981 Shaw et al.
4,538,779 A 9/1985 Goldstein
5,245,909 A * 9/1993 Corrigan et al. ............ 89/41.19
5,646,525 A 7/1997 Gilboa
6,205,636 B1 * 3/2001 Abe et al. ................... 29/407.1
6,230,382 B1 * 5/2001 Cunningham et al. ...... 29/407.1
6,457,672 B1 10/2002 Tai
7,194,326 B2 * 3/2007 Cobb et al. .................. 700/114
7,305,277 B2 * 12/2007 Freeman et al. ............. 700/114

(Continued)

FOREIGN PATENT DOCUMENTS

EP 957335 11/1999
EP 957335 A2 * 11/1999

OTHER PUBLICATIONS

Gary Williams, Edward Chalupa, and Steven Rahhal, Automated Positioning and Alignment Systems, Advanced Integration Technology, Inc..in SAE Automated Fastening Conference & Exposition, Sep. 2000.*

(Continued)

Primary Examiner—Albert DeCady  
Assistant Examiner—Dave Robertson  
(74) Attorney, Agent, or Firm—Toler Law Group

(57) ABSTRACT

Illustrative computer-executable methods, systems, and computer software program products compute orientation alignment transfer tool location. Orientation of at least one aerodynamically significant feature of an as-built airplane is automatically determined. Orientation of an orientation monument for the as-built airplane is automatically determined from the determined orientation of the at least one aerodynamically significant feature of the as-built airplane, and motion to align an orientation alignment transfer tool with the determined orientation of the orientation monument is automatically determined.

25 Claims, 34 Drawing Sheets

U.S. PATENT DOCUMENTS

| | | |
|---|---|---|
| 7,337,650 B1 * | 3/2008 | Preston et al. ............... 73/1.38 |
| 7,614,154 B2 | 11/2009 | Cobb |
| 2005/0150121 A1 | 7/2005 | Jaklitsch et al. |
| 2005/0172470 A1 * | 8/2005 | Cobb et al. ................ 29/407.1 |
| 2006/0224268 A1 * | 10/2006 | Freeman et al. ............. 700/114 |
| 2007/0095135 A1 | 5/2007 | Rueger |
| 2008/0046109 A1 * | 2/2008 | Freeman et al. ............. 700/114 |
| 2009/0086199 A1 | 4/2009 | Troy et al. |
| 2009/0112348 A1 | 4/2009 | Jones et al. |
| 2009/0112349 A1 | 4/2009 | Cobb et al. |
| 2009/0151143 A1 | 6/2009 | Jones |
| 2009/0157363 A1 | 6/2009 | Barnes et al. |
| 2009/0261201 A1 | 10/2009 | Stone |
| 2010/0085437 A1 | 4/2010 | Troy et al. |

OTHER PUBLICATIONS

Jihua, Z., Ahmad, R., and Yuqing, F. 2006. Research for major-parts digital assembly system of large-scale airplane. In Proceedings of the 5th WSEAS international Conference on Circuits, Systems, Electronics, Control & Signal Processing (Dallas, Texas, Nov. 1-3, 2006), pp. 337-343.*

Williams et al., Automated Positioning and Alignment Systems, Advanced Integration Technology, Inc., Society of Automated Engineers, Inc., Automated Fastening Conference & Exposition, Sep. 2000 (9 pgs.).

Jihua et al., Research for major-parts digital assembly system of large-scale airplane, Prooceedings of the 5th WSEAS International Conference on Circuits, Systems, Electronics, Control & Signal Processing, Dallas, Texas, Nov. 2006, (7 pgs.).

* cited by examiner $$d = \begin{Bmatrix} \theta_{RwingIncid} \\ \theta_{LwingIncid} \\ ABS(\theta_{RwingIncid} - \theta_{LwingIncid}) \\ \theta_{RwingSweep} \\ \theta_{LwingSweep} \\ \theta_{RstabIncid} \\ \theta_{LstabIncid} \\ \theta_{RstabSweep} \\ \theta_{LstabSweep} \\ \theta_{VertStabIncid} \\ \theta_{RengineIncid} \\ \theta_{LengineIncid} \\ \theta_{RengineToe} \\ \theta_{LengineToe} \end{Bmatrix}$$

*FIG. 4G*

$$\begin{array}{c} AoA\ (\alpha) \\ Bank\ (\phi) \\ Sideslip\ (\beta) \end{array}\ T = \left( \begin{array}{cccc} RwingIncid & LwingIncid & ABS(RwingIncid - LwingIncid) & RwingSweep \\ -0.5 & -0.5 & 0.073 & 0.123 \\ -4.908108327 & -4.908108327 & 0 & 1.504823667 \\ -2.485268762 & -2.485268762 & 0 & 0.973389333 \end{array} \right.$$

$$\left. \begin{array}{cccccc} LwingSweep & RstabIncid & LstabIncid & RstabSweep & LstabSweep \\ 0.123 & 0 & 0 & 0 & 0 \\ -1.504823667 & -0.283979617 & 0.283979617 & 0.002082341 & -0.002082341 \\ -0.973389333 & -0.096346716 & 0.096346716 & 0.004206274 & -0.004206274 \end{array} \right.$$

$$\left. \begin{array}{cccccc} VertStabIncid & RengineIncid & LengineIncid & RengineToe & LengineToe \\ 0 & 0 & 0 & 0 & 0 \\ 0.123631911 & -0.049627079 & 0.049627079 & -0.09203355 & -0.09203355 \\ 0.093153893 & -0.028748346 & 0.028748346 & 0.00117209 & 0.00117209 \end{array} \right)$$

*FIG.4H*

$$F = \begin{pmatrix} -0.5 & -0.5 & 0.073 & 0.123 & 0.123 & 0 & 0 \\ 712.7 & -712.7 & 0 & 2570 & -2570 & 437.8 & -437.8 \\ -1785700 & 1785700 & 0 & 696540 & -696540 & -72250 & 72250 \\ 274300 & -274300 & 0 & -111230 & 111230 & 28100 & -28100 \end{pmatrix}$$

$$\begin{pmatrix} 0 & 0 & 0 & 0 & 0 & 0 & 0 \\ 0 & 0 & 6830 & -20186 & 20186 & 630 & 630 \\ 847 & -847 & 133500 & 0 & 0 & 0 & 0 \\ 0 & 0 & -525700 & 0 & 0 & 0 & 0 \end{pmatrix}$$

$$A = \begin{pmatrix} 1 & 0 & 0 & 0 & 0 \\ 0 & -0.0001460850 & 0.000000245849 & -0.0000001508815 \\ 0 & 0.000000170173 & 0.000014241725 & 0.0000000206574 \end{pmatrix}$$

*FIG.4J*

$$F = \begin{pmatrix} -0.5 & -0.5 & 0.073 & 0.123 & 0.123 & 0 & -437.8 \\ 712.7 & -712.7 & 0 & 2570 & -2570 & 437.8 & 0 \\ -1785700 & 1785700 & 0 & 696540 & -696540 & -72250 & 72250 \\ 274300 & -274300 & 0 & -111230 & 111230 & 28100 & -28100 \end{pmatrix}$$

$$\begin{pmatrix} 0 & 0 & 0 & 0 & 0 & 0 & 0 \\ 0 & 0 & 6830 & -20186 & 20186 & 630 & 630 \\ 847 & -847 & 133500 & 0 & 0 & 0 & 0 \\ 0 & 0 & -525700 & 0 & 0 & 0 & 0 \end{pmatrix}$$

$$A = \begin{pmatrix} 1 & 0 & 0 & 0 & 0 & 0 & 0 \\ 0 & -0.000146085 & 0 & 0.000000245849 & 0 & -0.000001508815 \\ 0 & 0.00000170173 & 0.00000142241725 & 0.00000206574 \\ 0 & 0.00000218037 & 0.00000017586875 & 0.000000461405 \end{pmatrix}$$

*FIG.4K*

$$T = \begin{array}{c} AoA\,(\alpha) \\ Bank\,(\phi) \\ Sideslip\,(\beta) \\ Rudder \end{array} \begin{bmatrix} RwingIncid & LwingIncid & ABS(RwingIncid - LwingIncid) & RwingSweep \\ -0.5 & -0.5 & 0.073 & 0.123 \\ -4.908108327 & -4.908108327 & 0 & 1.504823667 \\ -2.485268762 & -2.485268762 & 0 & 0.973389333 \\ -1.874025928 & 1.874025928 & 0 & 0.717673164 \end{bmatrix}$$

$$\begin{bmatrix} LwingSweep & RstabIncid & LstabIncid & RstabSweep & LstabSweep \\ 0.123 & 0 & 0 & 0 & 0 \\ -1.504823667 & -0.283979617 & 0.283979617 & 0.002082341 & -0.002082341 \\ -0.973389333 & -0.096346716 & 0.096346716 & 0.004206274 & -0.004206274 \\ -0.717673164 & 0.003469875 & -0.003469875 & 0.001489608 & -0.001489608 \end{bmatrix}$$

$$\begin{bmatrix} VertStabIncid & RengineIncid & LengineIncid & RengineToe & LengineToe \\ 0 & 0 & 0 & 0 & 0 \\ 0.123631911 & -0.049627079 & 0.049627079 & -0.09203355 & -0.09203355 \\ 0.093153893 & -0.028748346 & 0.028748346 & 0.00117209 & 0.00117209 \\ -2.1745389 & -0.035500866 & 0.035500866 & 0.001373633 & 0.001373633 \end{bmatrix}$$

SYSTEM, METHOD, AND COMPUTER PROGRAM PRODUCT FOR COMPUTING ORIENTATION ALIGNMENT TRANSFER TOOL LOCATIONS TO TRANSFER PREDICTED CRUISE ORIENTATION ALIGNMENT OF AN AS-BUILT AIRPLANE

BACKGROUND

Final assembly of an aircraft entails aligning and moving components into a final set assembled configuration. Some of those components may be large-scale components such as fuselage sections. Some other components may also be large-scale components such as wings or a vertical fin that, in addition, may be aerodynamically significant. These components typically are placed on assembly jacks, located and aligned, and moved on the assembly jacks to be joined to each other.

It is desirable to predict trimmed cruise configuration of an as-built airplane. Typically, a separate post-assembly measurement survey of an assembled aircraft is performed to determine exact final locations of components in the as-built airplane in order to predict cruise configuration. However, performance of processes and procedures to perform a separate measurement survey of the aircraft after assembly can introduce additional flow time and can introduce additional costs to the final assembly process.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be illustrative, not limiting in scope. In various embodiments, one or more of the problems described above in the Background have been reduced or eliminated, while other embodiments are directed to other improvements.

In non-limiting, illustrative embodiments computer-executable methods, systems, and computer software program products are provided for computing orientation alignment transfer tool location. Orientation of at least one aerodynamically significant feature of an as-built airplane is automatically determined. Orientation of an orientation monument for the as-built airplane is automatically determined from the determined orientation of the at least one aerodynamically significant feature of the as-built airplane, and motion to align an orientation alignment transfer tool with the determined orientation of the orientation monument is automatically determined.

According to an aspect, the at least one aerodynamically significant feature is part of at least one component of an airplane, and orientation of at least one aerodynamically significant feature may be automatically determined by automatically computing orientation of the at least one aerodynamically significant feature with respect to its respective component and automatically computing orientation of the at least one aerodynamically significant feature in the as-built airplane.

According to other aspects, orientation of an orientation monument for the as-built airplane may be automatically determined by predicting cruise orientation for the as-built airplane from the orientation of the at least one aerodynamically significant feature in the as-built airplane, and automatically computing orientation of the orientation monument for the as-built airplane from the predicted cruise orientation for the as-built airplane. Also, motion to align an orientation alignment transfer tool with the determined orientation of the orientation monument may be automatically determined by automatically determining initial orientation of the orientation alignment transfer tool, automatically determining a displacement between the initial orientation of the orientation alignment transfer tool and the determined orientation of the orientation monument, and automatically determining motion of the orientation alignment transfer tool to achieve the displacement.

In addition to the illustrative embodiments and aspects described above, further embodiments and aspects will become apparent by reference to the drawings and by study of the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIGS. 4B, 4C, 4E, 4G, 4H, 4J, 4K, and 4L illustrate aspects of predicting cruise orientation;

FIGS. 6A-6C are screen shots of an illustrative, non-limiting implementation of computing assembly jack locations to align parts for assembly.

DETAILED DESCRIPTION

Computing Orientation Alignment Transfer Tool Location

Figure 1A:
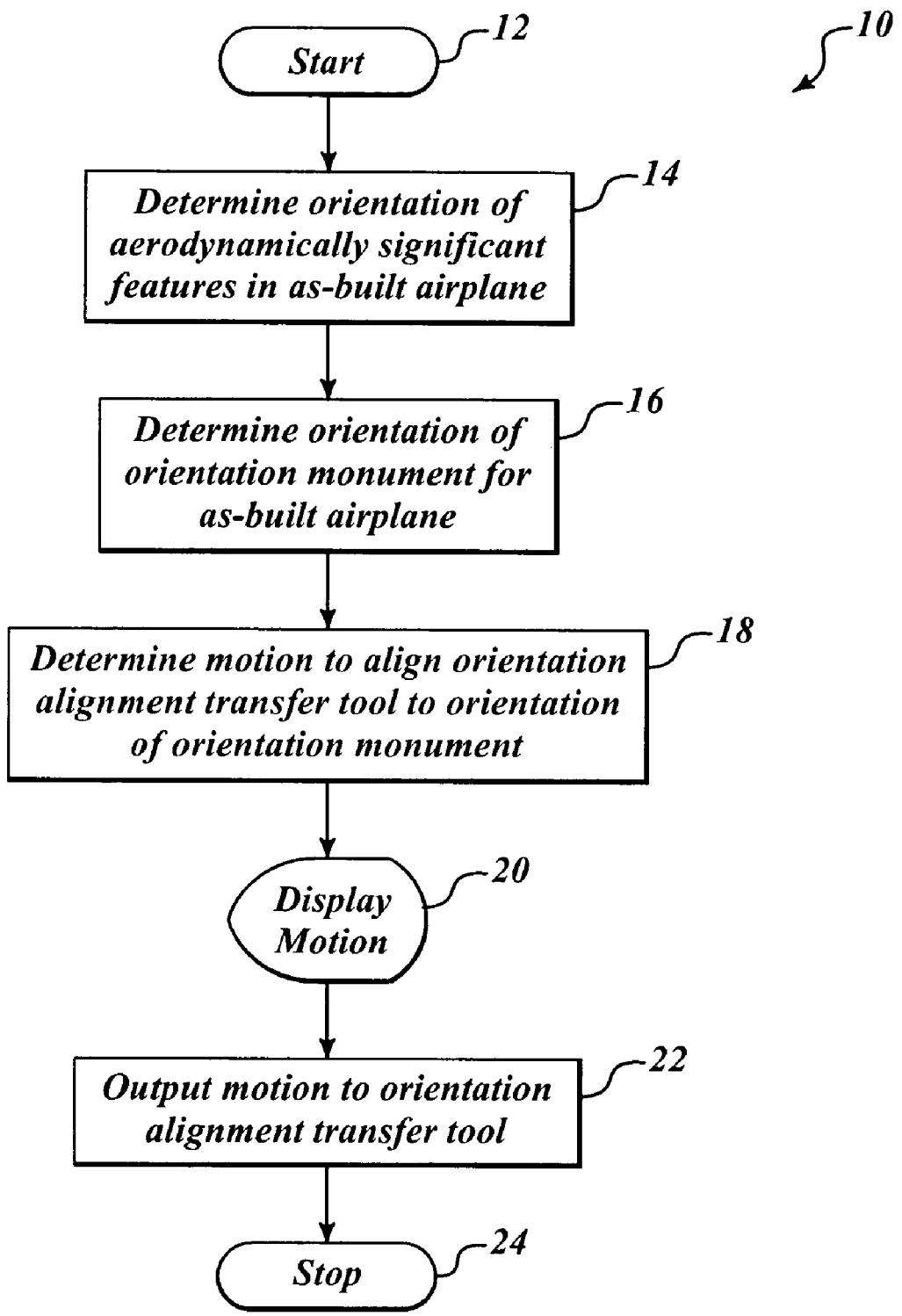
FIGS. 1A-1G are flowcharts of an illustrative method for computing orientation alignment transfer tool locations.

By way of overview, in some non-limiting, illustrative embodiments, orientation alignment transfer tool location is computed. Orientation of at least one aerodynamically significant feature of an as-built airplane is automatically determined. Orientation of an orientation monument for the as-built airplane is automatically determined from the determined orientation of the at least one aerodynamically significant feature of the as-built airplane, and motion to align an orientation alignment transfer tool with the determined orientation of the orientation monument is automatically determined.

Still by way of overview, the following explanation sets forth a context in which some embodiments can operate. In order to facilitate system alignment, some airplanes carry a physical monument, referred to herein as an orientation monument, that can act as a master orientation reference for airplane systems. According to some embodiments, the orientation monument may be aligned with, without limitation, a flight path vector and bank angle of the as-built airplane at nominal load and cruise conditions. Systems dependent upon alignment suitably are calibrated to orientation alignment of this orientation monument. Given by way of non-limiting example, to function properly certain airplane systems (such as an Earth Reference System, weather radar, Head-Up Display, and the like) which are attached to the airframe are aligned with the airplane flight path vector and the airplane bank angle. Deviation between the orientation of the systems and the flight path vector and bank angle can become evident in discrepant flight deck indication.

In order for the orientation monument to be physically mounted in the assembled airplane, orientation for the orientation monument is first "transferred" into the airplane. In some embodiments, computations can be performed to instruct a tool (referred to herein as an orientation alignment transfer tool) to be moved into a position that is aligned with the computed orientation alignment. When the orientation alignment transfer tool is moved into alignment with the computed orientation alignment, an inertial reference device, such as a gyroscope or the like, can be placed into the orientation alignment transfer tool and reset to the computed orientation alignment. The inertial reference unit, reset to the orientation alignment, can be removed from the orientation alignment transfer tool and brought into the airplane, thereby "transferring" the computed orientation alignment to the airplane. The inertial reference unit, that has been reset to the computed orientation alignment, can be located in the section, such as a midbody section, of the airplane in which the orientation monument is to be installed. The orientation monument then can be aligned with the inertial reference unit and physically installed in the airplane as desired.

Before explaining details of illustrative embodiments, some definitions of terms used herein will first be set forth. As used herein: (i) the term "part" or "component" means "part or subassembly"; (ii) the term "location" means "position and orientation in space"; (iii) the term "motion" means "change of location" and does not intend to specify any speeds, accelerations, or other dynamic behavior, although other embodiments could compute and control such behavior; (iv) all measurements, unless otherwise stated, are made with respect to a reference frame generally aligned with the defined airplane axis system and that is stable for the duration of the alignment process, such as without limitation a part-based system or a fixed coordinate system that has been established in a factory element, such as without limitation a floor; (v) an "aerodynamically significant feature" means a subset of major assembly features that may significantly affect the trimmed attitude of an airplane at 1-g cruise when their orientation to the airstream deviates from nominal and may include, by way of non-limiting examples, left-hand and right-hand wing surfaces, left-hand and right-hand horizontal stabilizer surfaces, vertical stabilizer (vertical fin) surface, and left-hand and right-hand engine thrust vectors; (vi) an "assembly interface" of a part means one or more features that together determine how that part is to be mated to another part; (vii) an "assembly operation" means alignment of two parts (that is, a part to be moved and a stationary part) in accordance with a relevant index plan such that they may be joined together; (viii) the term "nominal orientation of the as-built airplane" means orientation of the initial axis system or datum axis system associated with the as-built airplane structure that includes the stationary portion of the airplane assembly sequence; and (ix) for each such assembly operation, it is assumed herein that the stationary part remains fixed with respect to a factory coordinate system and the part to be moved is moved by means of a system of powered assembly jacks into alignment with the stationary part. Moreover, the desired final location of the part to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable part is aligned and moved (and hence defines the desired final location of the part to be moved). For purposes of illustration only and without any limitation whatsoever, this desired final location will be referred to herein and shown in the drawings as a stationary component of the structure to be assembled.

Referring now to FIG. 1A and still given by way of overview, an illustrative method 10 for computing orientation alignment transfer tool location begins at a block 12. At a block 14 orientation of at least one aerodynamically significant feature of an as-built airplane is automatically determined. As discussed above, an aerodynamically significant feature means a subset of major assembly features that may significantly affect stability of an airplane at 1-g cruise when their orientation to the airstream deviates from nominal and may include, by way of non-limiting examples, left-hand and right-hand wing surfaces, left-hand and right-hand horizontal stabilizer surfaces, vertical stabilizer (vertical fin) surface, and left-hand and right-hand engine thrust vectors.

At a block 16 orientation of an orientation monument for the as-built airplane is automatically determined from the determined orientation of the at least one aerodynamically significant feature of the as-built airplane. At a block 18 motion to align an orientation alignment transfer tool with the determined orientation of the orientation monument is automatically determined.

At a block 20 the determined motion may be displayed. For reasons discussed further below, the motion may be displayed as Euler angles. At a block 22 the determined motion may be output to an orientation alignment transfer tool. The method 10 stops at a block 24.

Now that an overview has been set forth and a context has been established, details of illustrative embodiments will be explained. First, illustrative embodiments for computing orientation alignment transfer tool location will be explained. Next, illustrative details will be set forth regarding computing orientation of components and determining motion. Illustrative details then will be explained regarding predicting cruise orientation. An illustrative system for performing the above functions will be described. Finally, screens from illustrative implementations of the above functions will be explained.

Figure 1B:
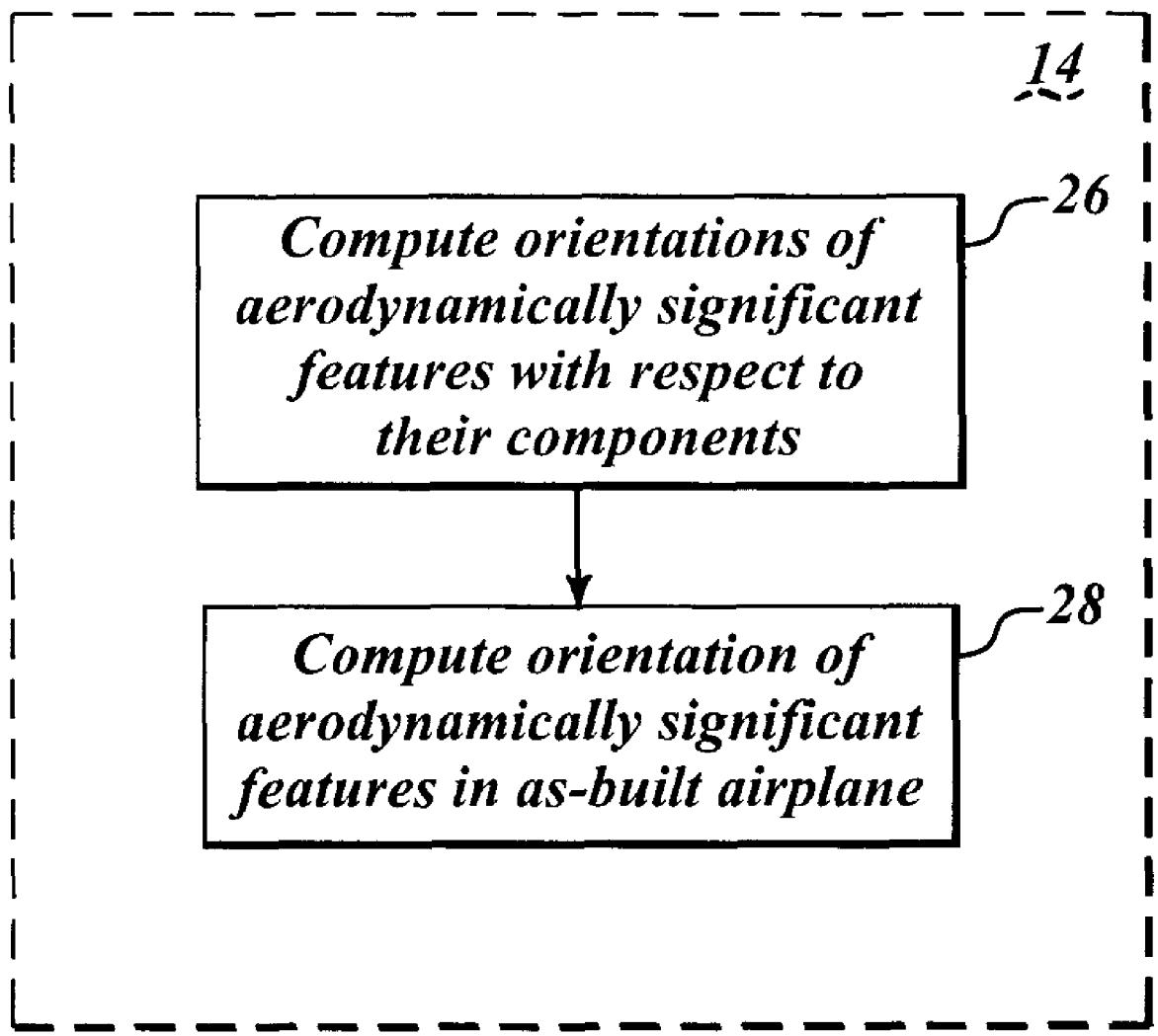

Referring additionally to FIG. 1B, processing within the block 14 to determine orientation of the aerodynamically significant features includes computing orientation of each aerodynamically significant feature with respect to its respective component at a block 26 and computing orientation of the aerodynamically significant features with respect to the as-built airplane at a block 28.

Figure 1C:
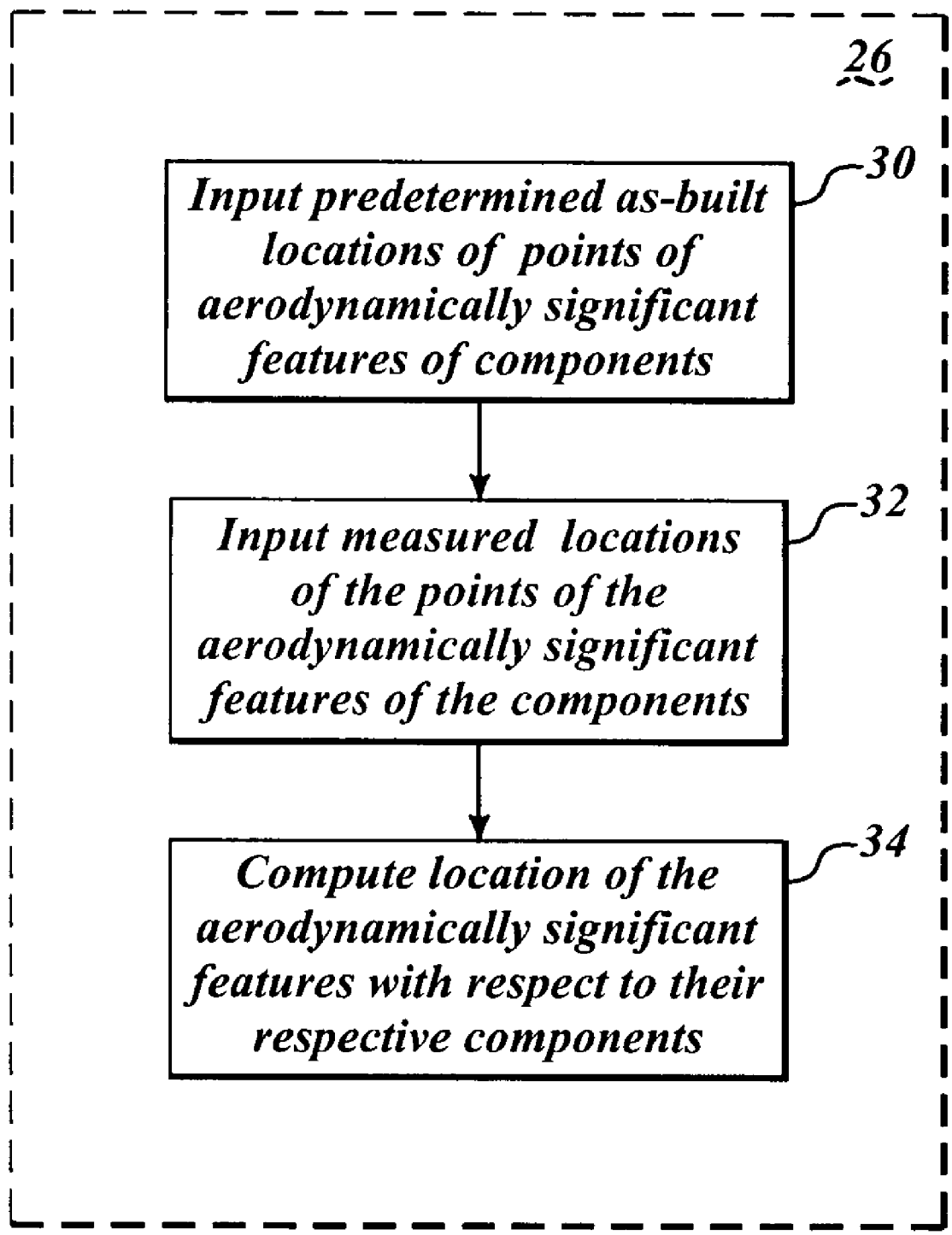

Referring additionally to FIG. 1C, in an illustrative embodiment processing within the block 26 to compute orientation of each aerodynamically significant feature with respect to its respective component entails further processes. The processing of the block 26 determines where in a component an aerodynamically significant feature is located.

At a block 30, predetermined as-built locations of points of the aerodynamically significant features are input into suitable computer processing components (discussed further below). The predetermined data regarding the as-built positions of the points typically may be obtained from vendors and/or suppliers of the aerodynamically significant feature. The predetermined data may be in the form of point data which represent locations in engineering design space of as-built points on the aerodynamically significant feature.

At a block 32 measured locations of the points of the aerodynamically significant feature are input into suitable computer processing components (discussed further below). The locations can be measured in any manner desired, such as without limitation in terms of azimuth and elevation and converted into coordinates in a coordinate system of the structure to be assembled.

The locations can be measured with any suitable measurement or metrology system whatsoever as desired for a particular application. For example and without limitation, the locations can be measured with a laser radar system, a laser tracker system, a photogrammetry system, an indoor global positioning system or infrared global positioning system, or the like. Given by way of example and not of limitation, a suitable system (that uses infrared global positioning system technology) for measuring locations of known reference points on assembly interfaces of at least one part to be moved and a stationary part (into which the movable parts are to be moved) is set forth in a concurrently-filed patent application bearing 11/977,986, entitled "System and Method for Locating Components of a Structure", and assigned to The Boeing Company, the same assignee as the assignee of this patent application, the entire contents of which are hereby incorporated by reference.

At a block 34 location of the at least one aerodynamically significant feature with respect to assembly interfaces of the component is computed from the predetermined as-built locations of the points of the at least one aerodynamically significant feature and from the measured locations of the points of the at least one aerodynamically significant feature. In some embodiments the location of at least one aerodynamically significant feature may be computed using a point cloud registration method. In some other embodiments the location of the at least one aerodynamically significant feature may be computed using a datum target registration method. Details of the point cloud registration method and the datum target registration method are discussed further below in the section entitled "Computing Orientation Of Components And Determining Motion".

Figure 1D:
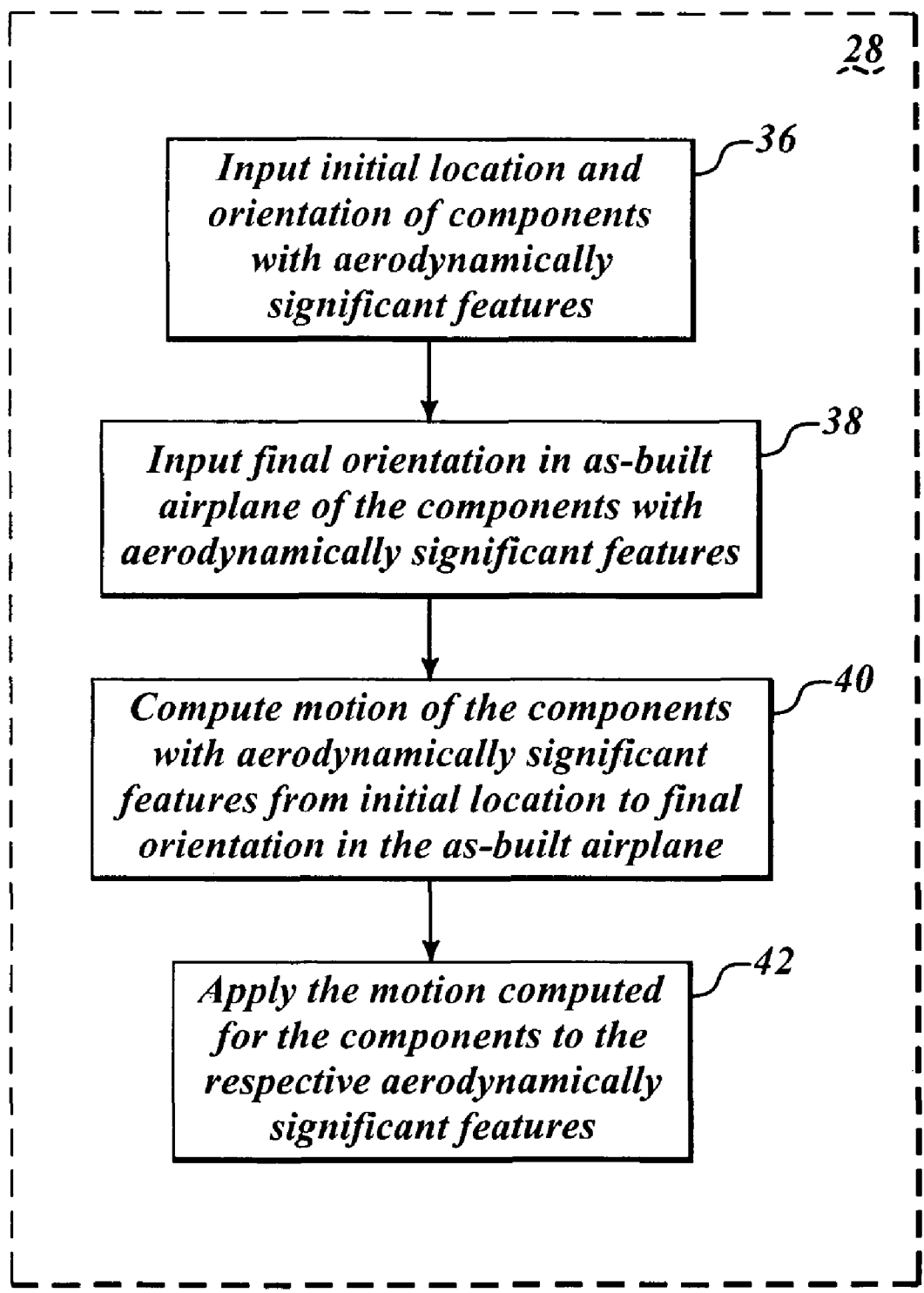

Referring additionally to FIG. 1D, in an illustrative embodiment processing within the block 28 to compute orientation of each aerodynamically significant feature with respect to the as-built airplane also entails further processes. The processing of the block 28 determines location and orientation within the as-built airplane of an aerodynamically significant feature based upon where in a component the aerodynamically significant feature is located and where in the as-built airplane the component is located.

At a block 36, initial location and orientation of at least one component with at least one aerodynamically significant feature are input into suitable computer processing components (discussed further below). For example, the component may an aft fuselage section (sometimes referred to as Section 47) of an airplane and the aerodynamically significant feature within the aft fuselage section may be a fin deck (which may affect the orientation of the vertical stabilizer). As another example, the component may be the Interface Reference Frame of a wing, which is determined by the mating features which control the assembly of the wing to the fuselage, and the aerodynamically significant feature within that reference frame may be the aerodynamic surface of the wing. In some embodiments, the initial location and orientation of components with aerodynamically significant features has already been determined as part of final assembly of the airplane. Thus, the initial location and orientation that has already been determined can be input. The initial location and orientation of the component may be determined as described further below in the section entitled "Computing Orientation Of Components And Determining Motion".

At a block 38, final orientation in an as-built airplane of the at least one component with at least one aerodynamically significant feature is input into suitable computer processing components (discussed further below). The final location and orientation of the component may be determined as described further below in the section entitled "Computing Orientation Of Components And Determining Motion".

At a block 40 motion of the at least one component with at least one aerodynamically significant feature from initial location of the at least one component with at least one aerodynamically significant feature to final orientation in the as-built airplane of the at least one component with at least one aerodynamically significant feature is automatically computed. The motion may be computed as described below in the section entitled "Computing Orientation Of Components And Determining Motion".

At a block 42 the motion computed for at least one component with at least one aerodynamically significant feature is automatically applied to the at least one aerodynamically significant feature. By applying motion determined for a component to an aerodynamically significant feature within the component, location and orientation within the as-built airplane is determined for the aerodynamically significant feature. The motion may be applied as described below in the section entitled "Computing Orientation Of Components And Determining Motion".

Figure 1E:
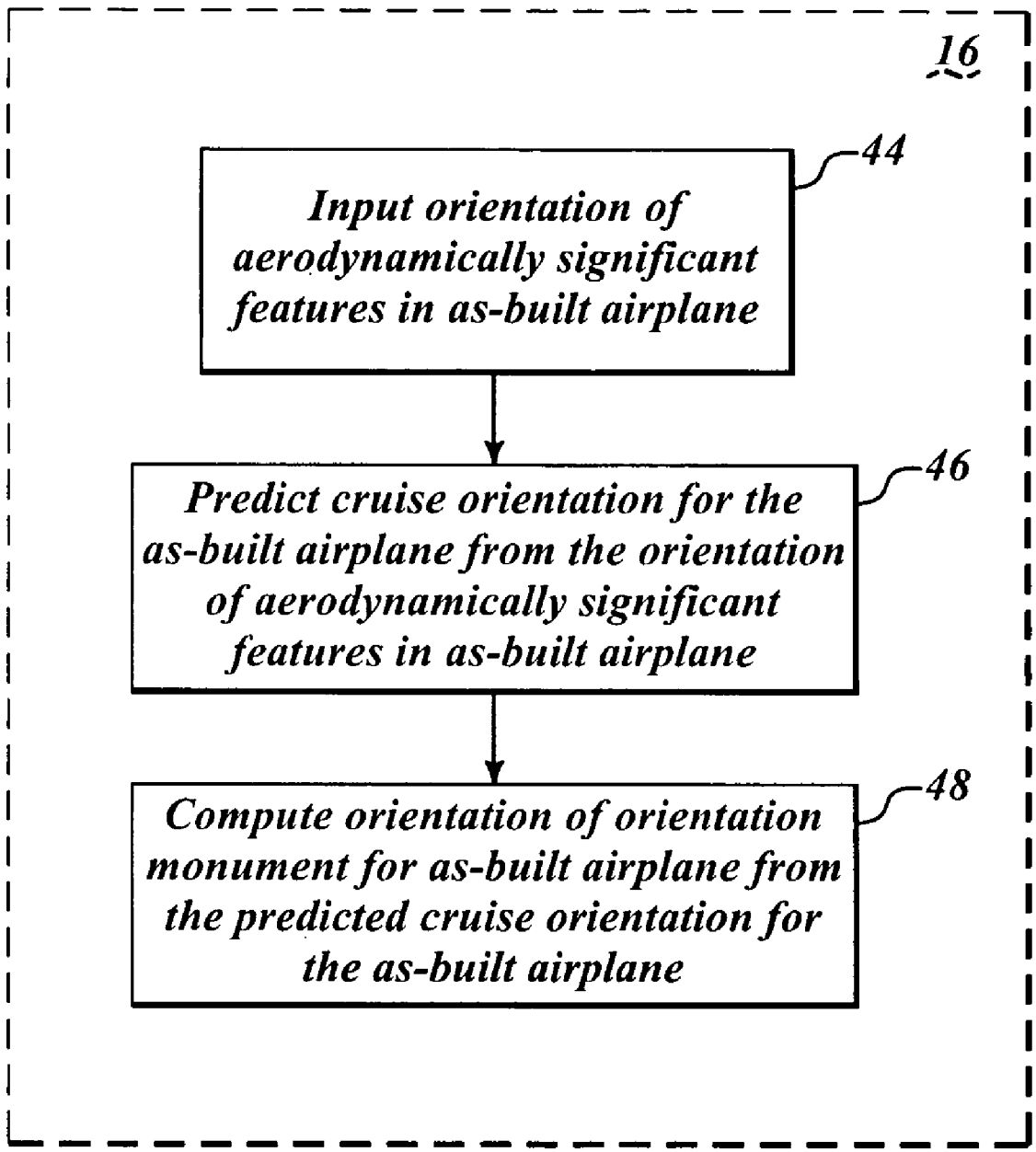

Referring now to FIGS. 1A and 1E, in an illustrative embodiment processing within the block 16 to compute orientation of the orientation monument entails further processes. At a block 44 orientation of at least one aerodynamically significant feature in an as-built airplane is input into suitable computer processing components (discussed further below).

At a block 46 cruise orientation for the as-built airplane is predicted from the orientation of at least one aerodynamically significant feature in the as-built airplane. Processing within the block 46 to predict cruise orientation entails several processes. Details regarding illustrative processes for predicting cruise orientation for an as-built airplane are explained further below in the section entitled "Predicting Cruise Orientation".

Figure 1F:
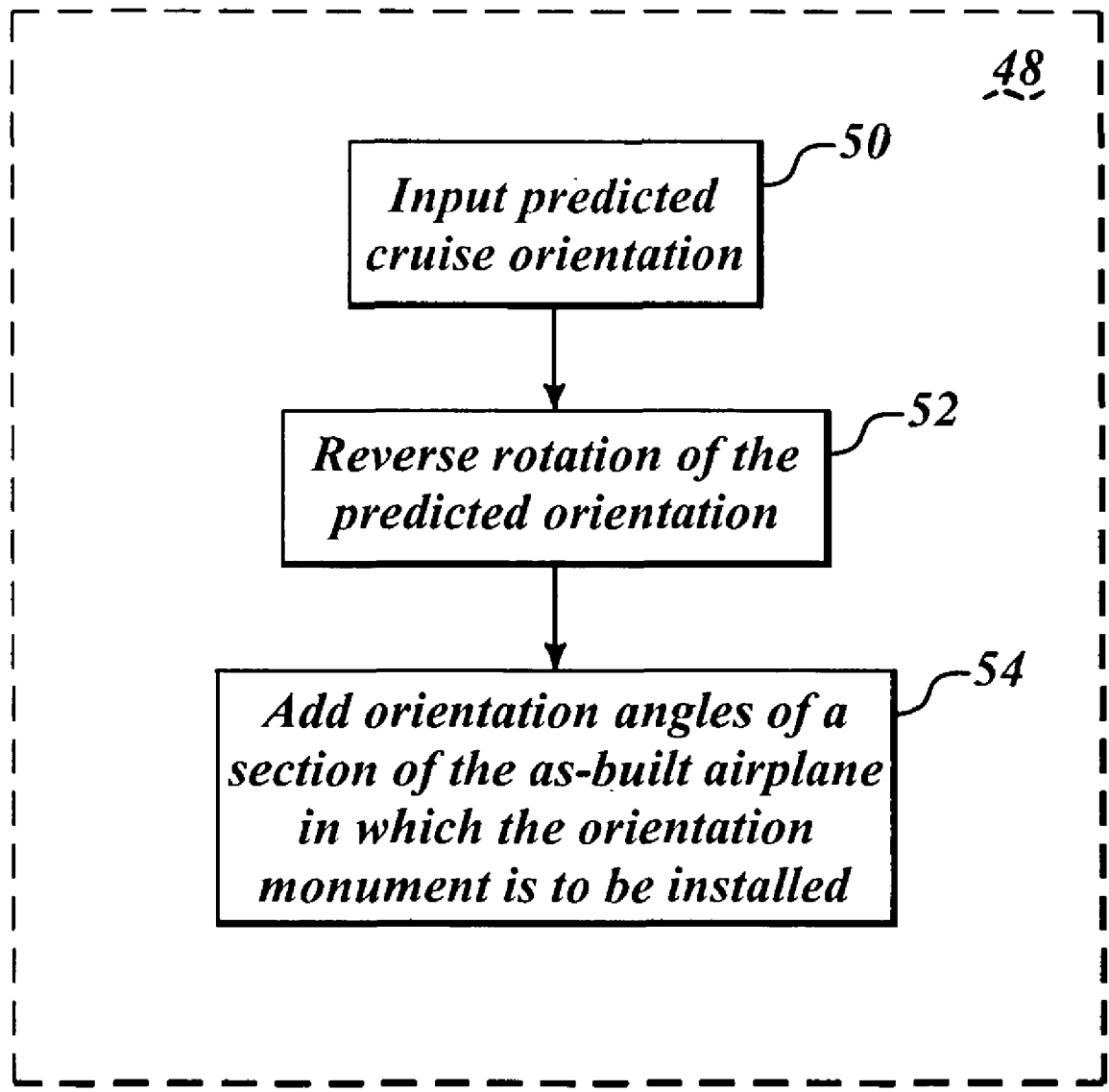

At a block 48 orientation of the orientation monument for the as-built airplane is computed from the predicted cruise orientation for the as-built airplane. Illustrative processing within the block 48 to compute orientation of the orientation monument entails several processes. Referring additionally to FIG. 1F, at a block 50 predicted cruise orientation is input into suitable computer processing components (discussed further below).

At a block 52, in some embodiments rotation of the predicted cruise orientation may be reversed. The rotation of the predicted cruise orientation is reversed because the cruise orientation prediction estimates the orientation change from the velocity vector to the as-built airplane, but that change which will be used in subsequent processing is the orientation change from the as-built airplane to the velocity vector.

At a block 54 orientation angles of a section of the as-built airplane in which the orientation monument is to be installed (such as, without limitation, a mid-body section of a fuselage) are added to predicted (and, if applicable, reversed) cruise orientation. Orientation angles for the section of the as-built airplane in which the orientation monument is to be installed suitably have been determined as part of the final assembly process for the as-built airplane as described below in the section entitled "Computing Orientation Of Components And Determining Motion". Adding the orientation angles of a section of the as-built airplane in which the orientation monument is to be installed produces orientation of the orientation monument with respect to a reference frame of the facility in which the orientation alignment transfer tool is used.

Now that desired orientation of the orientation monument has been determined, at the block 18 motion is determined to align orientation of the orientation alignment transfer tool to the determined orientation of the orientation monument. As discussed above, once the orientation alignment transfer tool has been aligned with the determined orientation of the orientation monument an inertial reference device, such as a gyroscope or the like, can be placed into the orientation alignment transfer tool and reset to the computed orientation alignment. The inertial reference device, reset to the orientation alignment, can be removed from the orientation alignment transfer tool and brought into the airplane, thereby "transferring" the computed orientation alignment to the into airplane. Then, the orientation monument can be installed as desired in the airplane.

Figure 1G:
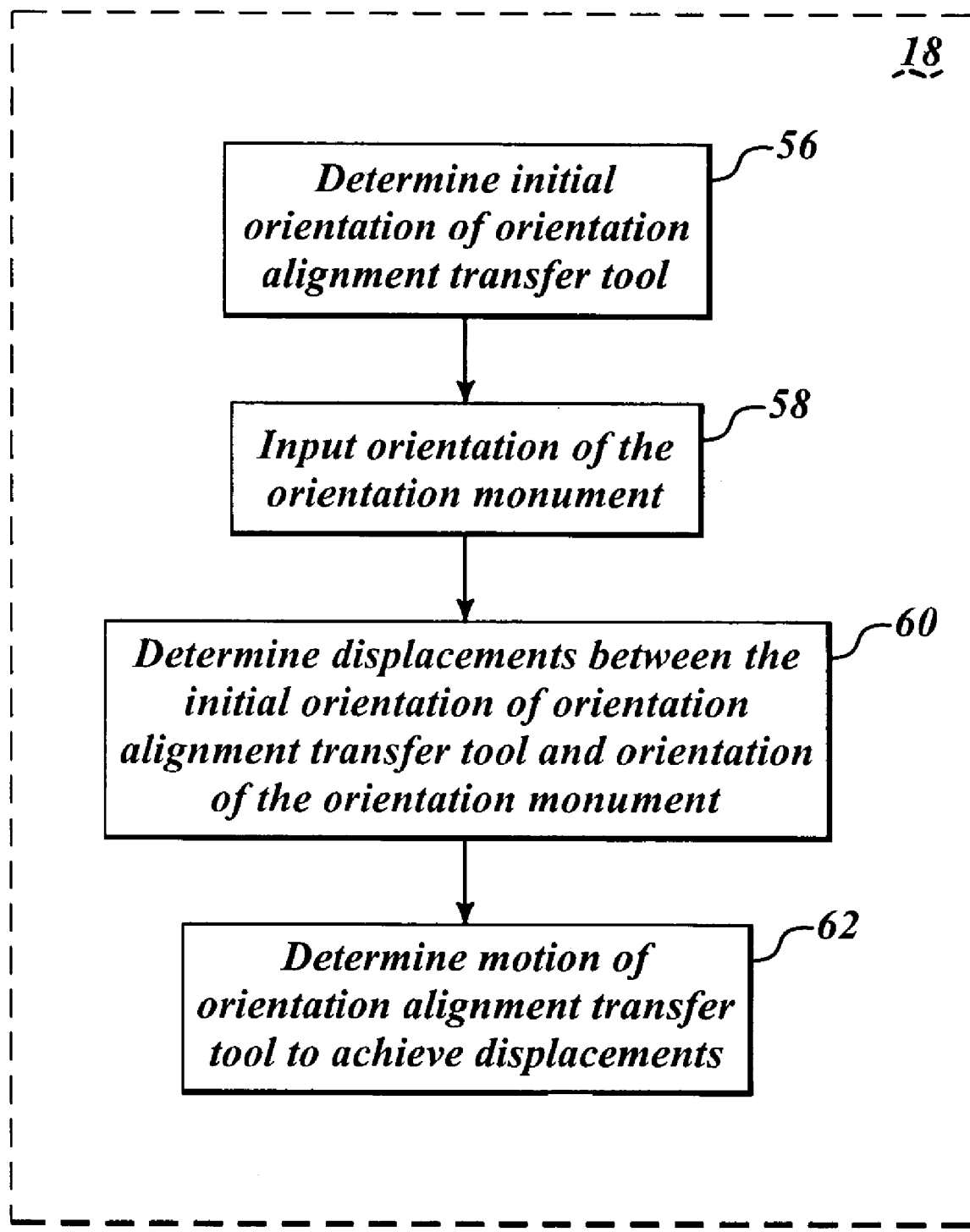

Processing within the block 18 to determine motion to align orientation of the orientation alignment transfer tool to the determined orientation of the orientation monument entails several processes. Referring now to FIGS. 1A and 1G, at a block 56 initial orientation of the orientation alignment transfer tool is determined. Initial orientation of the orientation alignment transfer tool may be determined as described below in the section entitled "Computing Orientation Of Components And Determining Motion".

At a block 58 the determined orientation of the orientation monument (that was determined at the block 16 (FIGS. 1A and 1F)) is input into suitable computer processing components (discussed further below).

At a block 60 a displacement is automatically determined between the initial orientation of the orientation alignment transfer tool and the determined orientation of the orientation monument.

At a block 62 motion of the orientation alignment transfer tool to achieve the displacement is automatically determined. The motion to achieve the displacement may be a rigid motion determined as described below in the section entitled "Computing Orientation Of Components And Determining Motion".

Computing Orientation of Components and Determining Motion

Now that the method 10 has been explained, details of illustrative processes performed within the method 10 will be explained. These processes include point cloud registration method, datum target registration method, determination of location and orientation, and determination of motion.

In addition to use in the method 10 as described above, these processes are used to determine motion for assembly jacks for final assembly of airplane components into an as-built airplane (as well as other components and structures) as disclosed in a co-pending U.S. patent application entitled "System, Method, and Computer Program Product for Computing Jack Locations to Align Parts for Assembly" and filed Oct. 26, 2007, bearing 11/977,987, and assigned to The Boeing Company, the same assignee as the assignee of this patent application, the entire contents of which are hereby incorporated by reference.

To that end, and additionally because location and orientation data used in the method 10 is generated during computation of jack locations to align parts for assembly, details will be set forth below for computing jack locations to align parts for assembly.

The method 10 computes orientation alignment transfer tool location. As discussed above, computing orientation alignment transfer tool location enables aligning orientation of the orientation alignment transfer tool to the determined orientation of the orientation monument (that is based upon predicted cruise orientation for an as-built airplane), thereby enabling mounting of the orientation monument in an as-built airplane with the desired orientation of the orientation monument.

As such, the method 10 uses data generated during computation of jack locations to align airplane parts for assembly into an as-built airplane. However, use within the particular context of illustrative embodiments disclosed herein for computing orientation alignment transfer tool location is not intended to imply any limitation whatsoever of applicability to airplane parts of computation of jack locations to align parts for assembly.

Figure 2A:
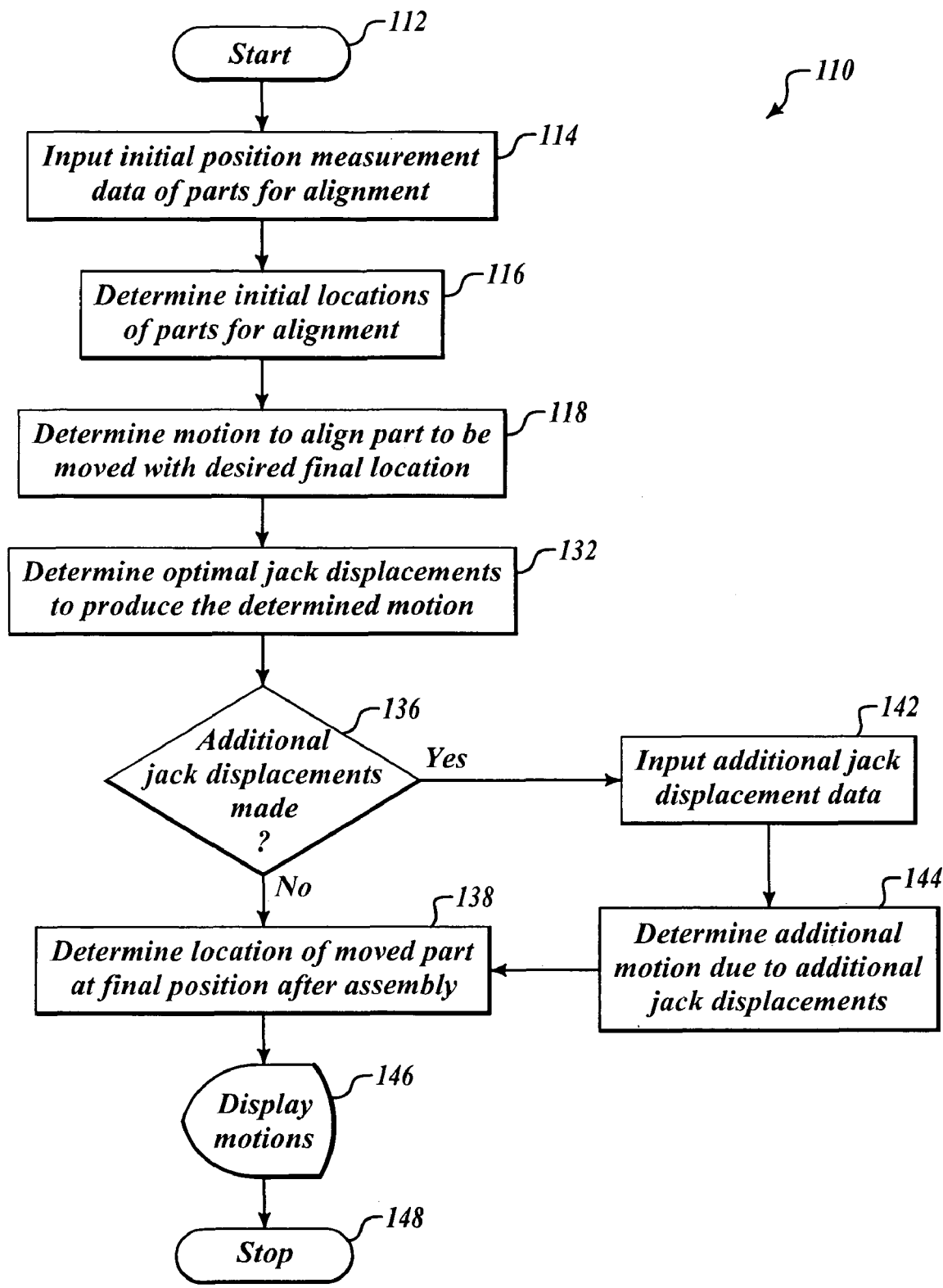
FIGS. 2A-2E are flowcharts of an illustrative method for computing assembly jack locations to align parts for assembly.

Referring now to FIG. 2A, a method 110 for computing assembly jack locations to align parts for assembly begins at a block 112. The method 110 suitably is a computer-executable method that uses measured locations of parts to compute assembly jack locations to align those parts for assembly into a structure. It is emphasized that the desired final location of the part to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable part is aligned and moved (and hence defines the desired final location of the part to be moved). It will be appreciated that portions of the method 110 can be used to determine locations and orientations that will be input into and used by the method 10 (FIG. 1A) to compute orientation alignment transfer tool location to align the orientation alignment transfer tool to a desired final location (that is, the desired orientation of the orientation monument).

At a block 114 measured initial positions of parts for alignment are input into suitable computer processing components (discussed further below). The initial positions that are measured suitably are locations of known reference points on assembly interfaces of at least one part to be moved and a stationary part (into which the movable parts are to be moved, thereby assembling the structure). The locations can be measured in any manner desired, such as without limitation in terms of azimuth and elevation and converted into coordinates in a coordinate system of the structure to be assembled.

The locations can be measured with any suitable measurement or metrology system whatsoever as desired for a particular application. For example and without limitation, the locations can be measured with a laser radar system, a laser tracker system, a photogrammetry system, an indoor global positioning system or infrared global positioning system, or the like. Given by way of example and not of limitation, a suitable system (that uses infrared global positioning system technology) for measuring locations of known reference points on assembly interfaces of at least one part to be moved and a stationary part (into which the movable parts are to be moved) is set forth in a concurrently-filed patent application filed Oct. 26, 2007 and bearing 11/977,986, entitled "System and Method for Locating Components of a Structure", and assigned to The Boeing Company, the same assignee as the assignee of this patent application, the entire contents of which are hereby incorporated by reference. One of the parts the location of which is measured in such a manner is the orientation alignment transfer tool.

At a block 116 initial locations of the part(s) to be moved and the stationary part are determined from the initial position measurement data input at the block 114. As mentioned above, location entails components of position and orientation in space. At a block 118 motion to align the part(s) to be moved with the desired final location, such as the stationary part, is determined.

The concepts of location and motion as used herein are inter-related. As such, the following discussion explains both (i) determination of initial locations at the blocks 56 (FIG. 1G) and 116 and (ii) determination of motion at the blocks 18 (FIG. 1A) and 118.

In explaining location and motion, the following notational conventions are used herein: (i) 3×3 matrices are represented by bold face capital letters: A, B, C, etc.; (ii) 3D vectors are represented by bold face lower case letters: a, b, c, etc.; (iii) scalars (for example, angles) are in non-bold face lower case letters: a, b, c, etc., or by lower case Greek letters: $\alpha$, $\beta$, $\gamma$, etc.; and (iv) parts and features are represented by non-bold face capital letters: A, B, C, etc.

Within the above context, a rigid motion in space is a combination of rotation and translation in space. A mathematical rigid motion in this sense can be thought of either (i) as a physical change of location with respect to a fixed coordinate system or (ii) as a transformation between two different coordinate systems. Embodiments disclosed herein use the same representation for both.

The locations and motions used in the embodiments disclosed herein are not intended to be limited to rigid motions. The locations and motions could, for example, include elastic deformations. However, some measurement technology and assembly jack systems currently in use are not capable of dealing with elastic deformations. Therefore, for the sake of brevity, rigid motions will be discussed to explain the non-limiting, illustrative embodiments disclosed herein.

Representations of locations and motions in space involve matrices and angles. Mathematically, a rigid motion can be thought of as a combination of a 3×3 rotation matrix U and a 3-dimensional translation vector t. These are often combined into a single 4×4 matrix, which is mathematically equivalent to the form used herein. If x represents the coordinates of a point before the motion and x' represents the coordinates of the point after the motion, then $$x' = Ux + t. \quad (1)$$

where Ux represents matrix multiplication of the 3×3 matrix U and the 3×1 matrix (i.e., vector) x. In some contemplated manufacturing scenarios, both (i) an upstream variation simulation process (in which parts and structures are designed and in which trade studies are performed) and (ii) factory assembly processes use this representation of a rotation as a 3×3 matrix.

Figure 3A:
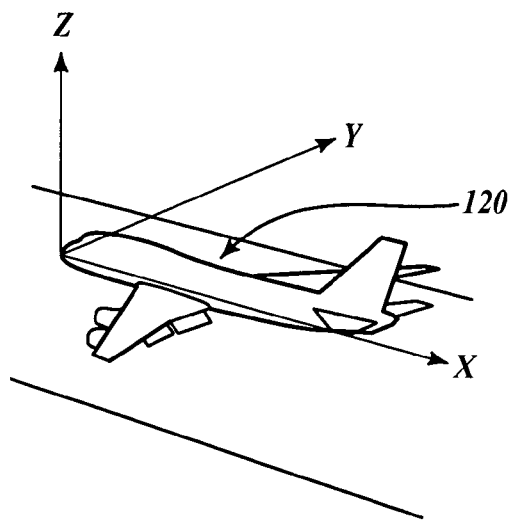
FIG. 3A illustrates an illustrative coordinate system.

Referring additionally to FIG. 3A, an illustrative system of Euler angles is used in some embodiments. An illustrative coordinate system of a structure 120 includes an X axis, a Y axis, and a Z axis. An illustrative system of Euler angles ($\theta$, $\phi$, $\psi$) is described as follows: rotate through angle $\theta$ about an X axis, then through angle $\phi$ about an original (that is, un-rotated) Y axis, then through angle $\psi$ about an original (that is, un-rotated) Z axis. The use of un-rotated axes for rotation is well adapted to a factory application. While an order in which the rotations are applied may be chosen arbitrarily, the same order is to be used consistently throughout the application. This consistency is entailed because different orders produce different results in 3-space (as will be discussed further below).

There is a mathematically exact transformation between Euler angles and rotation matrices except in a few special cases. For the particular scheme of Euler angles defined above, these special cases occur where cos $\phi$=0 when the mapping back from matrices to Euler angles becomes ambiguous. Thus, when $\phi$=±90° each choice of $\phi$ corresponds to a different choice of $\theta$. However, either choice of $\phi$ and $\theta$ leads back to the same rotation matrix. It will be noted, though, that $\phi$=±90° is not expected to occur for contemplated applications of disclosed embodiments.

Figure 3B:
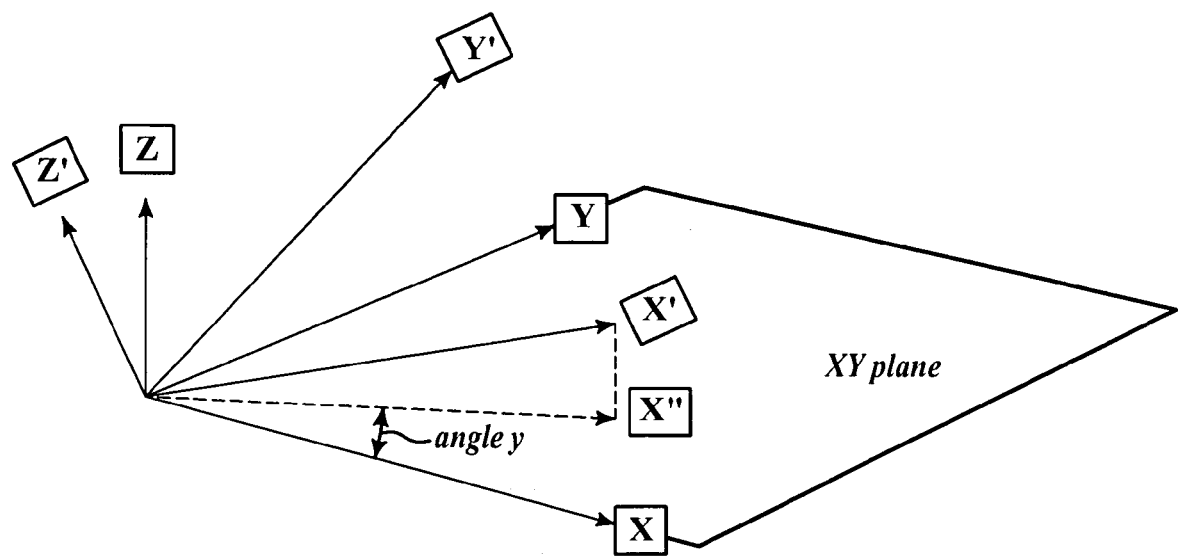
FIG. 3B illustrates planar projection angles.

Referring additionally now to FIG. 3B, for purposes of measuring rotations from a physical object and for predicting aerodynamic effects, Euler angles are not as appropriate as planar projection angles. Planar projection angles are defined procedurally as follows:

r=roll angle. Let Y"=the projection of the rotated Y' axis onto the un-rotated YZ plane. Then r is the angle between Y" and the un-rotated Y axis.

p=pitch angle. Let X"=the projection of the rotated X' axis onto the un-rotated XZ plane. Then p is the angle between X" and the un-rotated X axis.

y=yaw angle. Let X"=the projection of the rotated X' axis onto the un-rotated XY plane. Then y is the angle between X" and the un-rotated X axis.

These definitions of planar projection angles are adapted to components of some structures that are assembled by some embodiments (for examples, structures such as aircraft and maritime vessels that have roll, pitch, and yaw axes). However, it will be appreciated that other similar definitions could be made for different applications.

There is a mathematically exact transformation between the planar projection angles (r, p, y) and the Euler angles ($\theta$, $\phi$, $\psi$), and hence to rotation matrices U, which is numerically stable as long as all of the angles have magnitude bounded below 90°. It will be noted that this is the case for contemplated applications of disclosed embodiments.

Because all planar projection angles are measured independently, there is no arbitrary choice of order involved. When all angles are small (such as on the order of 1° or less), the difference between planar projection angles and the set of Euler angles used in disclosed embodiments is negligible. It will also be noted that this, too, is the case with all planar projection angles used in contemplated applications of disclosed embodiments.

Thus, determining motion at the blocks 18 (FIG. 1A) and 118 entails an application of point registration that finds a rigid motion which relates the coordinate system defined by a set of nominal (as-designed) points $\{x_1, x_2, x_3, \ldots\}$ to a corresponding set of as-built points $\{y_1, y_2, y_3, \ldots\}$. The rigid motion can be found in two ways—a point cloud registration and a datum target registration. Whether a point cloud registration is used or a datum target registration is used in a particular case depends on the indexing plan for joining the parts in question.

The first registration method—the point cloud registration method—suitably is a best-fit method that is used when there is a number N>3 of measurement points, and the registration is to be based by "best fitting" all of them simultaneously. In one embodiment, the best fit could be, illustratively and without limitation, a least-squares fit. Mathematically, the least-squares point cloud registration method finds a rigid motion in the form x'=Ux+t such that the sum of squares of all the residuals $$\sum_{i=1}^{N} \left| \ldots - \ldots' \right|^2$$

is minimized over all possible U and t. This operation suitably may be done by a standard method described in K. S. Arun, T. S. Huang, and S. D. Blostein; "Least Square Fitting of Two 3-D Point Sets"; *IEEE Transactions on PAMI*, 9(5):698-700, 1987. In some embodiments, if desired the mathematical software that does this computation may be the same software as that which is used in the vendor software used for variation simulation by engineering personnel for component and structure design and trade studies.

The second registration method—the datum target registration method—is used when, instead of considering all the measurement points equally, a hierarchical structure is imposed. An example of such a method is the 3-2-1 method described as follows:

Define a primary coordinate plane X=0 to pass through points $x_1$, $x_2$, $x_3$.

Define a secondary coordinate plane Y=0 to pass through points $x_4$ and $x_5$, while being perpendicular to the primary.

Define a tertiary coordinate plane Z=0 to pass through the point $x_6$ while being perpendicular to both the primary and the secondary.

The mechanics of this procedure are defined by national and international standards, such as without limitation *Dimensioning and Tolerancing*, ASME Y14.5M-1994, American Society of Mechanical Engineers, New York, 1995. As with the point cloud registration method, if desired this procedure may be followed both in the disclosed embodiments and in the vendor software used for variation simulation by engineering personnel.

Determining the motion at the blocks 18 (FIG. 1A) and 118 entails combining rigid motions. Before combining rigid motions is explained, combining rotations will first be explained. Combining two rotations is done by matrix multiplication. Thus, if the first rotation has matrix V and the second has matrix U, then the operation of performing the first rotation and then the second has matrix UV. The order matters, because with matrix multiplication in general UV≠VU. For example, referring back to FIG. 3A, rotating 90° about the X axis leaves the structure 120 (shown without limitation for illustration purposes as an aircraft) with its left wing pointed down but the nose pointed forward, and a further rotation of 90° about the Y axis points the nose straight up. However, starting with the rotation about Y points the nose up, and following with the rotation about X points the nose to the left. Reversing a rotation represented by the matrix U is done by taking the matrix inverse $U^{-1}$.

Combining rigid motions is similar to combining rotations, except that the translation vectors must also be combined. In disclosed embodiments, there are two basic scenarios that involve combining rigid motions: (i) motion to align two components; and (ii) orientation of an aerodynamically significant feature. Other applications are merely combinations of these scenarios.

Figure 2B:
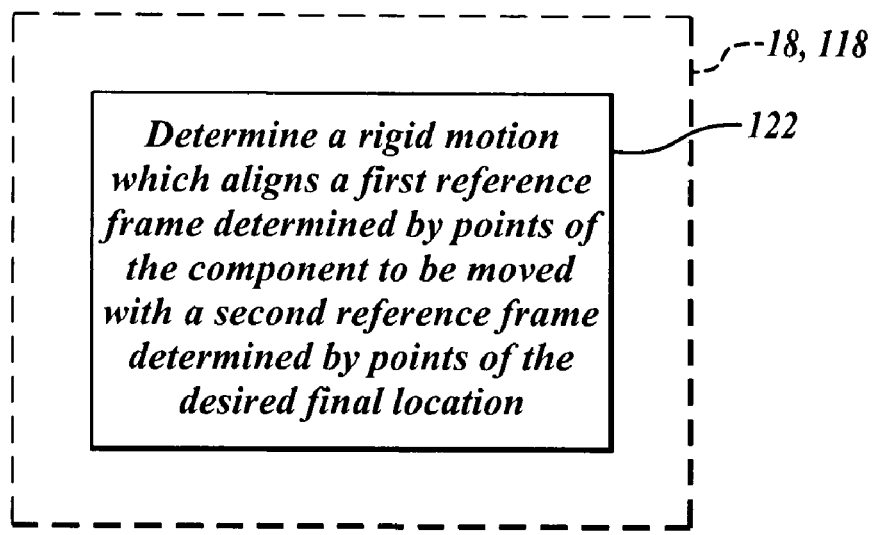
Figure 3C:
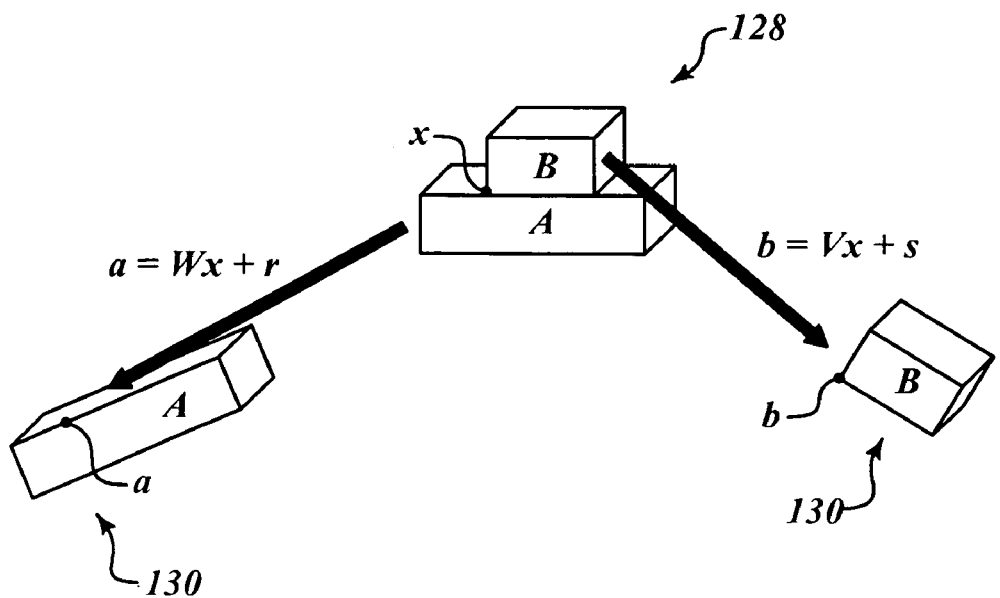
FIGS. 3C-3E illustrate computation of rigid motion to align a movable part with a final location.
Figure 3D:
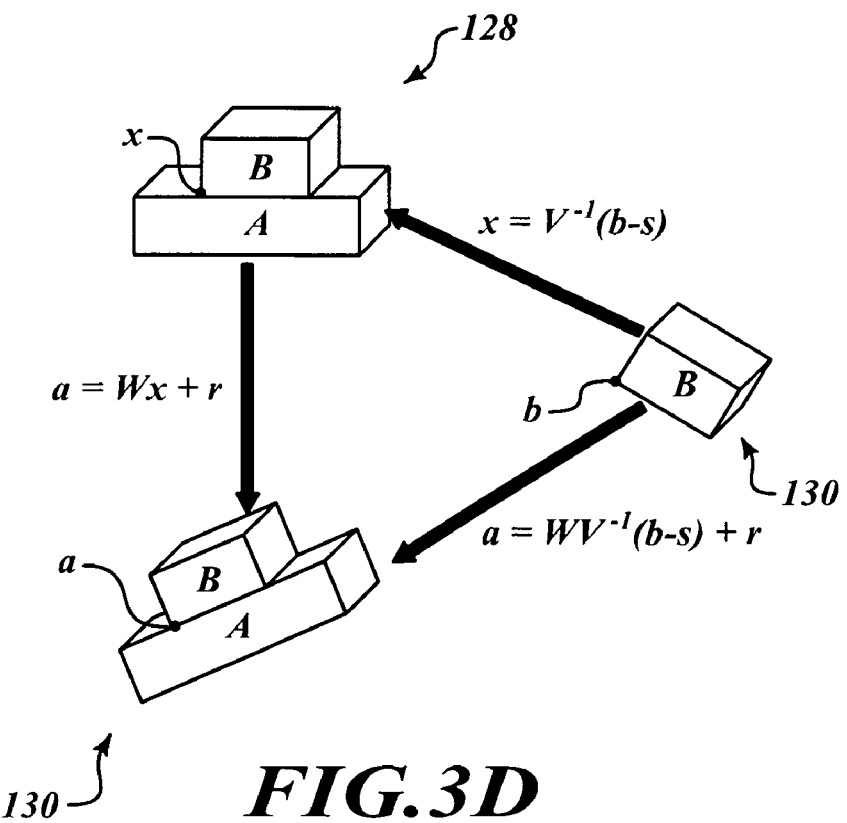

First, motion to align two components will be discussed. Referring now to FIGS. 1A, 2A and 2B, determining motion to align the part(s) to be moved with the desired final location, such as aligning the orientation alignment transfer tool with the desired orientation of the orientation monument at the block 18 or such as aligning a part to be moved with the stationary part at the block 118, entails processing at a block 122, at which a rigid motion is determined which aligns a reference frame determined by points of the part(s) to be moved with a reference frame determined by points of the desired final location, such as the desired orientation of the orientation monument or the stationary component. Referring additionally to FIGS. 3C and 3D, given by way of non-limiting example component A is to remain fixed and component B is to move during a join or other operation. Let the nominal measurement points of A be $\{a_1, \ldots, a_N\}$ with corresponding measured points $\{a'_1, \ldots, a'_N\}$. Similarly, the nominal measurement points of B are $\{b_1, \ldots, b_M\}$ with corresponding measured points $\{b'_1, \ldots, b'_M\}$. There is no requirement for the nominal points on A to be the same as those on B, or even that N=M. At the block 122, a rigid motion a=Ub+t is computed which aligns the reference frame defined by the points $\{b'_1, \ldots, b'_M\}$ of B with the reference frame defined by the points $\{a'_1, \ldots, a'_N\}$ of A.

Figure 2C:
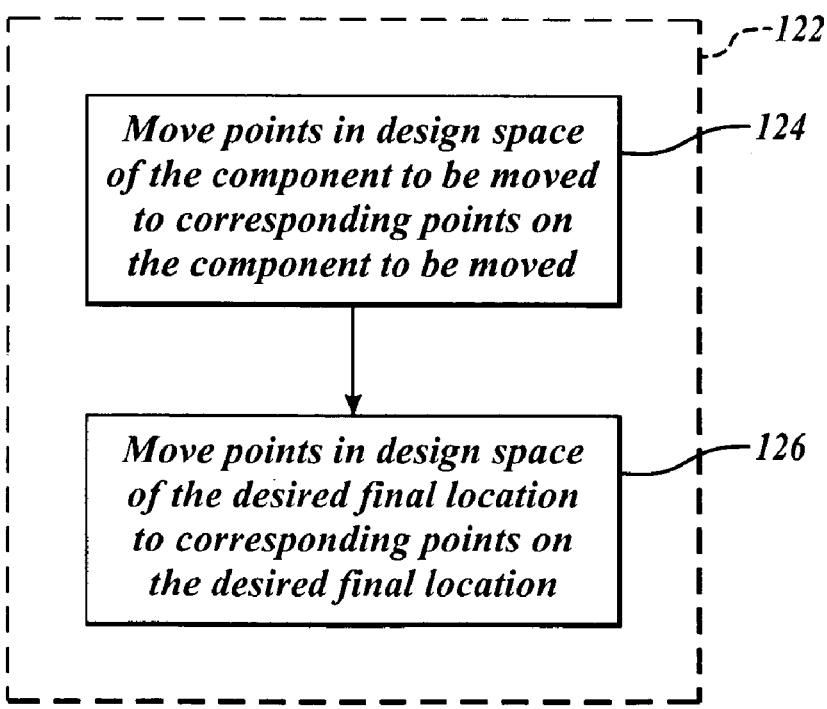

Referring additionally to FIG. 2C, in some embodiments determination of the rigid motion at the block 122 is performed in two stages. In the first stage, at a block 124 points in design space of the part(s) to be moved are moved to corresponding points on the part(s) to be moved and at a block 126 points in design space of the desired final location, such as the desired orientation of the orientation monument or the stationary part, are moved to corresponding points on the final location, such as the desired orientation of the orientation monument or the stationary part. As shown in FIG. 3C, the parts A and B are aligned in design space 128. At the block 124 a rigid motion b=Vx+s is found which moves every point x in design space 128 to its corresponding point b on the component B on a factory floor 130. Similarly, at the block 126 a rigid motion a=Wx+r is found that moves an arbitrary point x in design space 128 into its corresponding point a on the component A on the factory floor 130.

In the second stage, the motion a=Ub+t is determined. The equation b=Vx+s is solved for x, giving $x=V^{-1}(b-s)$, which is then substituted into the equation a=Wx+r to get $$a = WV^{-1}(b-s) + r = WV^{-1}b + r - WV^{-1}s = Ub + t$$

where $$U = WV^{-1}, \text{ and } t = r - WV^{-1}s = r - Us. \tag{2}$$

Thus, the rigid motion a=Ub+t can be applied to points on the part(s) to be moved (that is, the component(s) B) from their initial locations on the factory floor 130 (that was determined at the blocks 56 (FIG. 1G) and 116 (FIG. 2A)) such that the part(s) B will be aligned with the final location or stationary part A at the location of final location or the stationary part A on the factory floor 130 (that was determined at the block 16 (FIG. 1A) or the block 116 (FIG. 2A)) in the same manner that they are aligned in design space 128.

Figure 3E:
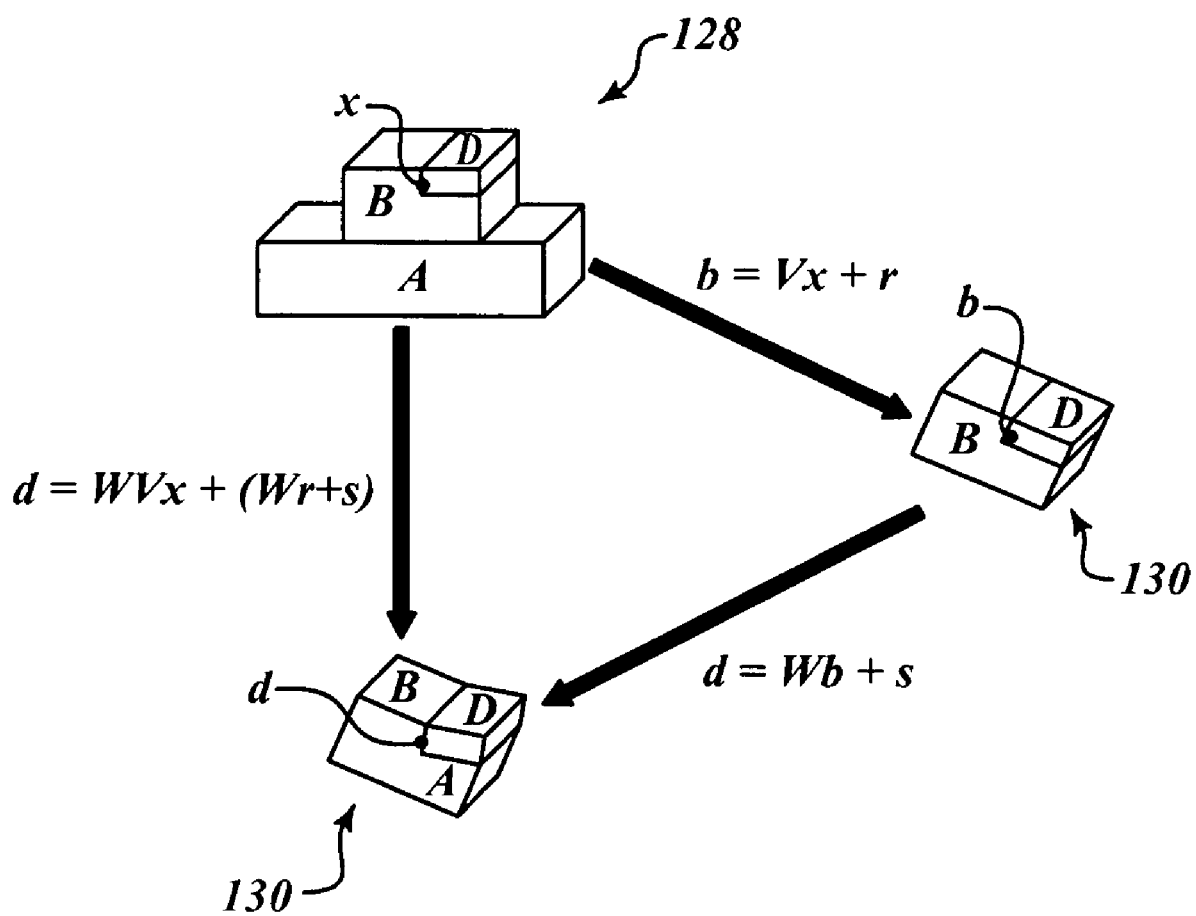

Referring additionally now to FIG. 3E, in some instances the component B may contain an aerodynamically significant feature D that may be subject to manufacturing variation. That is, the aerodynamically significant feature D may not be in its nominal location with respect to the datum reference frame defined by the points $\{b_1, \ldots, b_M\}$. In such a case a motion d=Ux+t is found that carries the nominal location of any point x on the aerodynamically significant feature D to its actual location on the factory floor 130. Let b=Vx+s be a rigid motion that locates the reference points $\{b_1, \ldots, b_M\}$ on the factory floor 130, and let d=Wb+r be a rigid motion that locates the aerodynamically significant feature D with respect to the datum reference frame defined by the reference points $\{b_1, \ldots, b_M\}$. Then the transformation is given by $$d=Wb+r=W(Vx+s)+r=WVx+Ws+r=Ux+t$$

where $$U=WV, t=Ws+r. \quad (3)$$

Figure 2D:
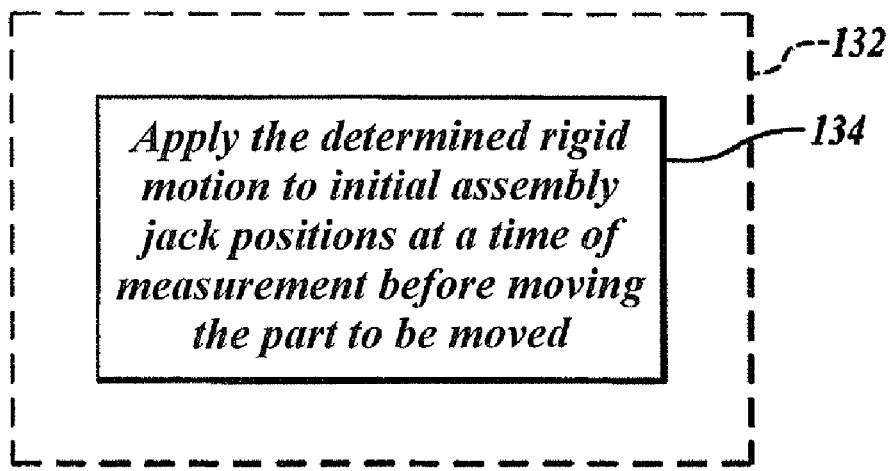

Referring back to FIG. 2A, after the rigid motion b'=Ub+t has been determined, at a block 132 optimal displacements of assembly jacks are determined that will produce the determined motion for the part(s) to be moved into alignment with the final location or stationary part. The assembly jacks that support the part(s) to be moved and the stationary part have axes that desirably are aligned with axes of the coordinate system of the structure to be assembled (and therefore with the factory coordinate system in which the parts are measured). Referring additionally to FIG. 2D, determining the optimal assembly jack displacements entails processing at a block 134 at which the determined rigid motion is applied to initial assembly jack positions at a time of measurement before moving the part(s) to be moved. Thus, displacements of the assembly jacks (upon which the part(s) to be moved are supported) that were determined at the block 132 will result in the determined rigid motion to align the part(s) to be moved with the stationary part. The same processing performed at the block 134 suitably is also performed at the block 62 (FIG. 1G) to determine motion of the orientation alignment transfer tool to achieve a displacement between the initial orientation of the orientation alignment transfer tool and orientation of the orientation monument.

Referring back to FIG. 2A, at a decision block 136 a determination is made whether additional assembly jack displacements have been made after the part(s) has been moved on the assembly jacks into alignment with the desired final location, such as the stationary part. For example, additional assembly jack displacements may be made by assembly mechanics to adjust the actual location of the moved part(s) from the computed optimal location for the moved part(s) at the final set location in which the stationary part and the moved part(s) are fastened together.

Figure 2E:
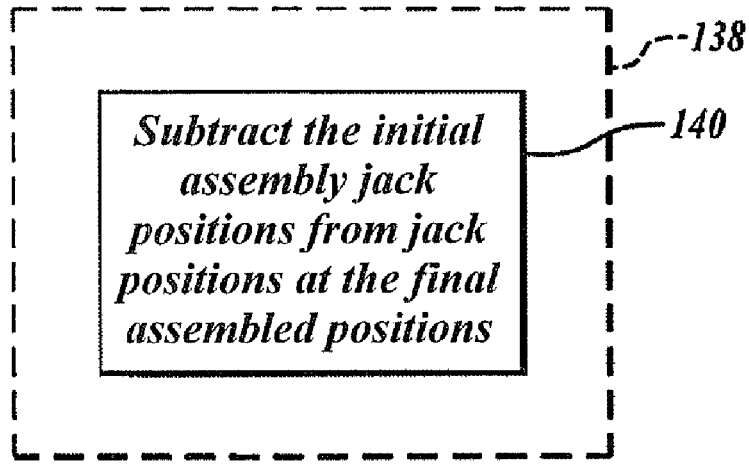

If no additional assembly jack displacements have been made, then at a block 138 the location of the moved part(s) at a final assembled position is determined. Referring additionally to FIG. 2E, determining the location of the moved part(s) at a final assembled position entails processing at a block 140 at which the initial assembly jack positions are subtracted from jack positions at the final assembled positions. If the axes of the jack system are not aligned with the axes of the common factory coordinate system, an additional rotational correction is applied to express the jack delta motions in terms of the jack axis directions.

If additional assembly jack displacements have been made, then at a block 142 additional data is input regarding additional assembly jack displacements made by assembly mechanics to adjust the actual location of the moved part(s) from the computed optimal location for the moved part(s) at the final set location. For example, assembly jack control processing can measure the difference between the pre-computed optimal jack locations and the locations at final set. At a block 144, additional motion due to additional assembly jack displacement is determined. For example, from the measured differences between the pre-computed optimal jack locations and the locations at final set a rotation that represents the motion from initial set to final set can be determined. This rotation suitably is reported in the form of planar projection angles, as described above. The planar projection angles may be transformed to Euler angles, and then to 3×3 matrix form. However, because these delta angles typically will be small in contemplated applications of disclosed embodiments, the Euler angles ($\theta$, $\phi$, $\psi$) can be taken to be equal to the planar projection angles (r, p, y). Processing then proceeds to the block 138 as described above.

At a block 146 motions are displayed. Euler angles suitably are used to communicate information about rotations to assembly mechanics on the factory floor because Euler angles contain more easily interpreted information than a 3×3 matrix. Precision in these numbers is required only when the numbers become small, at which point the Euler angles are substantially the same as planar projection angles.

The method 110 stops at a block 148.

Predicting Cruise Orientation

Figure 4A:
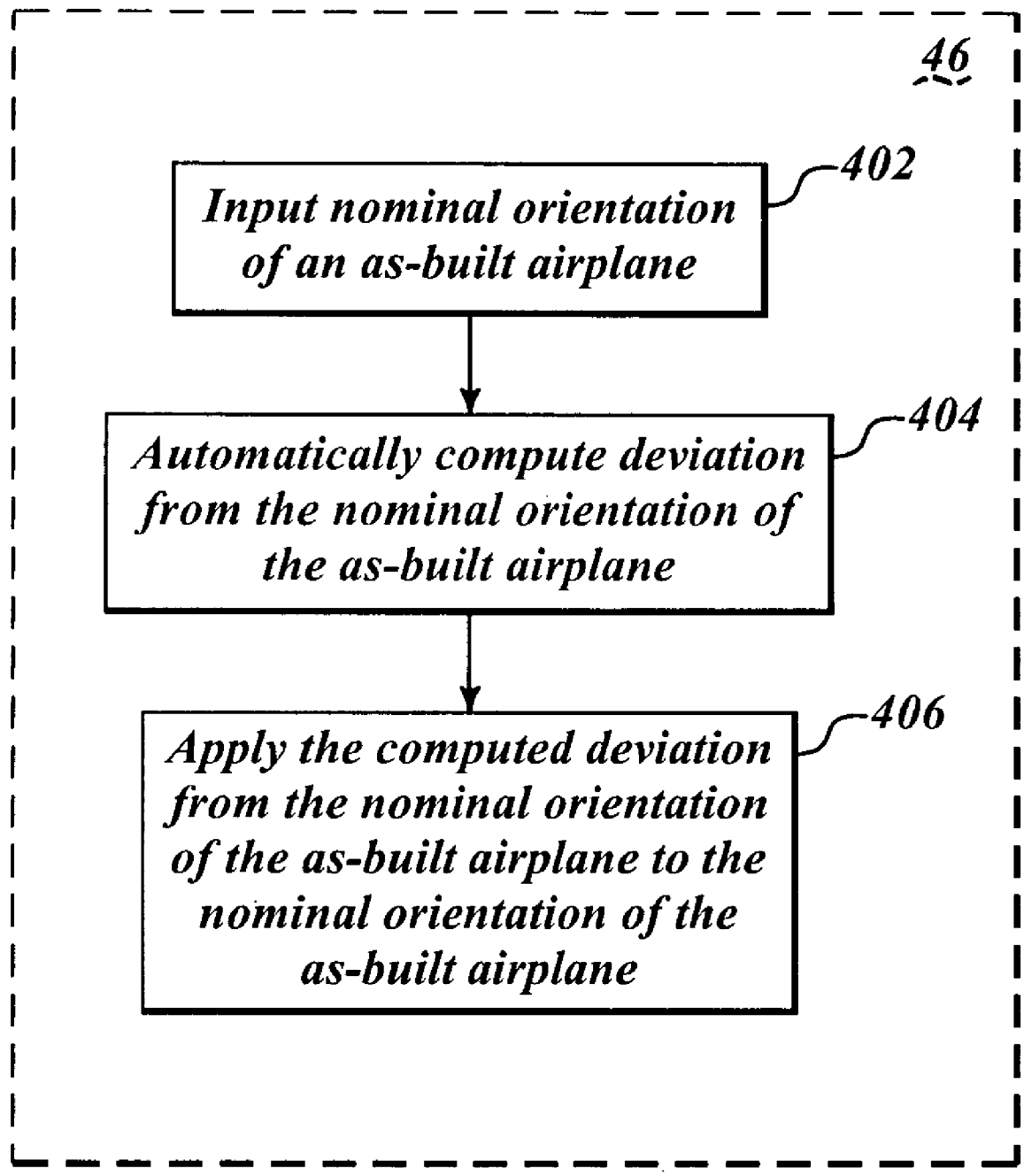
FIGS. 4A, 4D, 4F, and 4I are flowcharts of an illustrative method for predicting cruise orientation.

Referring now to FIG. 4A, illustrative details are set forth regarding illustrative prediction of cruise orientation for the as-built airplane from the orientation of the at least one aerodynamically significant feature in the as-built airplane at the block 46. By way of overview, at a block 402 nominal orientation of an as-built airplane is input. Deviation from the nominal orientation of the as-built airplane is automatically computed at a block 404, and the computed deviation from the nominal orientation of the as-built airplane is applied to the nominal orientation of the as-built airplane at a block 406. Illustrative details will now be set forth.

Various assumptions may be made regarding cruise orientation as desired. For example, controls of the airplane are assumed to be trimmed per recommended procedures for the particular airplane. All movable surfaces are assumed to be rigged to nominal. Airplane load conditions are assumed to be at nominal. The airplane is assumed to be at 1-g cruise. The airplane is assumed to be operating in still air. Systems are assumed to be aligned to the as-defined airplane axis, and nominal airplane pitch at cruise is not considered.

Figure 4B:
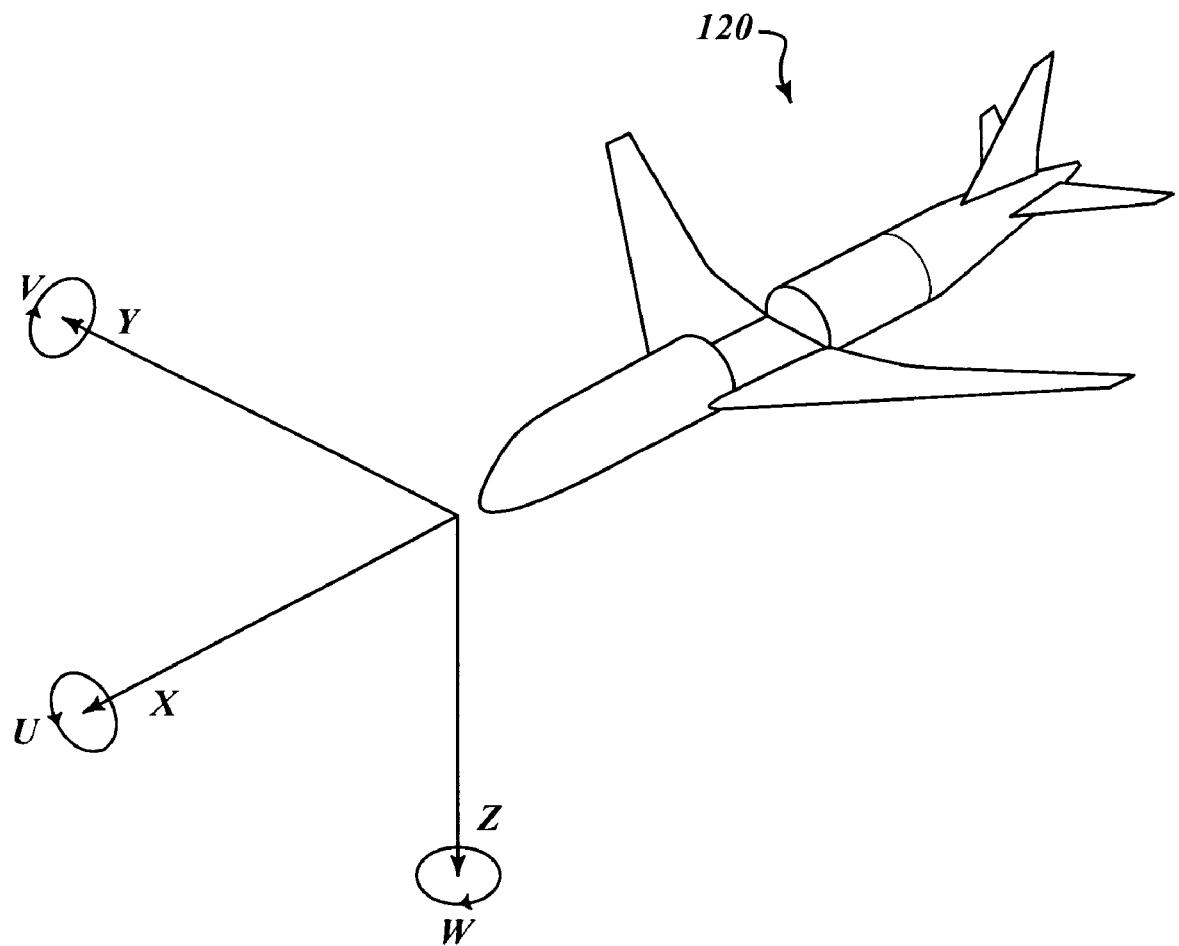

Referring additionally to FIG. 4B, the nominal orientation of the as-built airplane was previously discussed in the context of the structure 120 (FIG. 3A) as a coordinate system that includes an X axis, a Y axis, and a Z axis. Variation from the nominal orientation suitably is measured as angular rotation, or angular offset, about the axes. For example, angular rotation U represents angular offset about the X axis; angular rotation V represents angular offset about the Y axis; and angular rotation W represents angular offset about the Z axis.

Figure 4C:
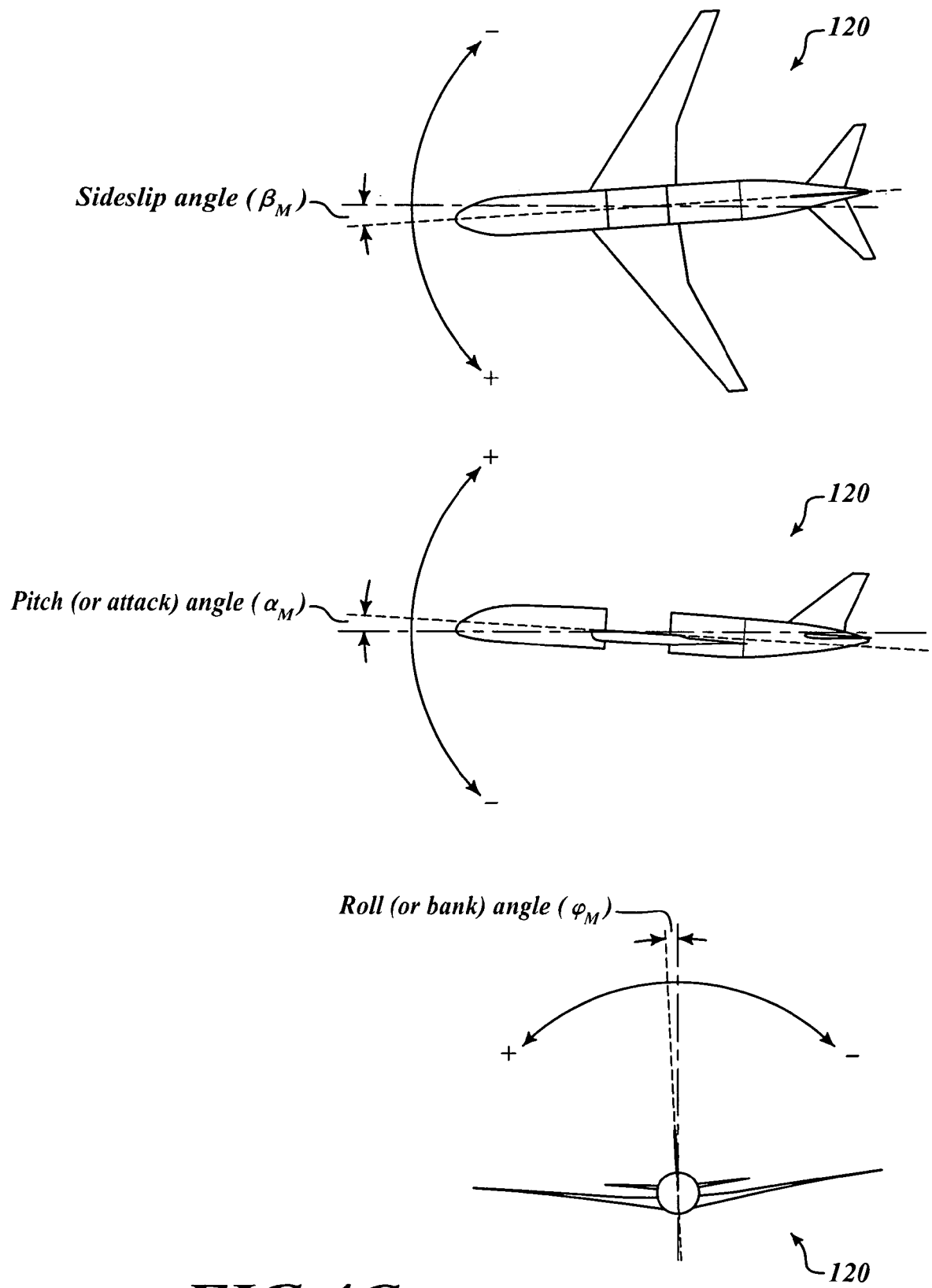

Referring additionally to FIG. 4C, the predicted cruise orientation is represented by three components that are angular offsets from the nominal orientation of the as-built airplane. Offset pitch angle or offset angle of attack, $\alpha_M$, is angular rotation about the Y axis of the nominal cruise orientation. Offset sideslip angle, $\beta_M$, is angular rotation about the Z axis of the nominal cruise orientation. Offset roll angle or offset bank angle, $\phi_M$, is angular rotation about the X axis of the nominal cruise orientation.

Figure 4D:
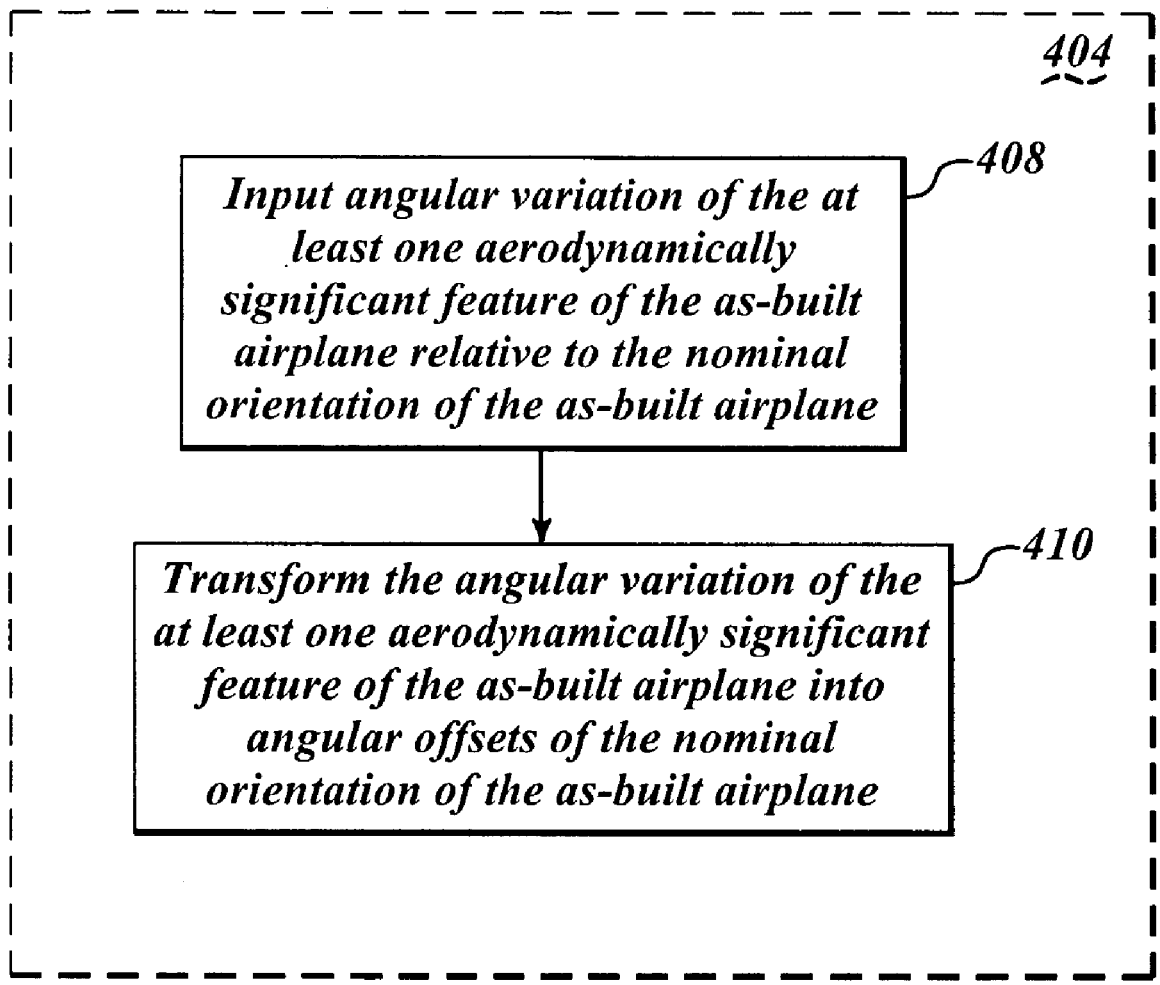

Referring additionally to FIG. 4D, processing within the block 404 to compute deviation from the nominal orientation of the as-built airplane entails further processes. At a block 408 angular variation of at least one aerodynamically significant feature of the as-built airplane relative to the nominal orientation of the as-built airplane is input into suitable computer processing components (discussed further below), and at a block 410 the angular variation of the at least one aerodynamically significant feature is automatically transformed into angular offsets of the nominal orientation of the as-built airplane.

Figure 4E:
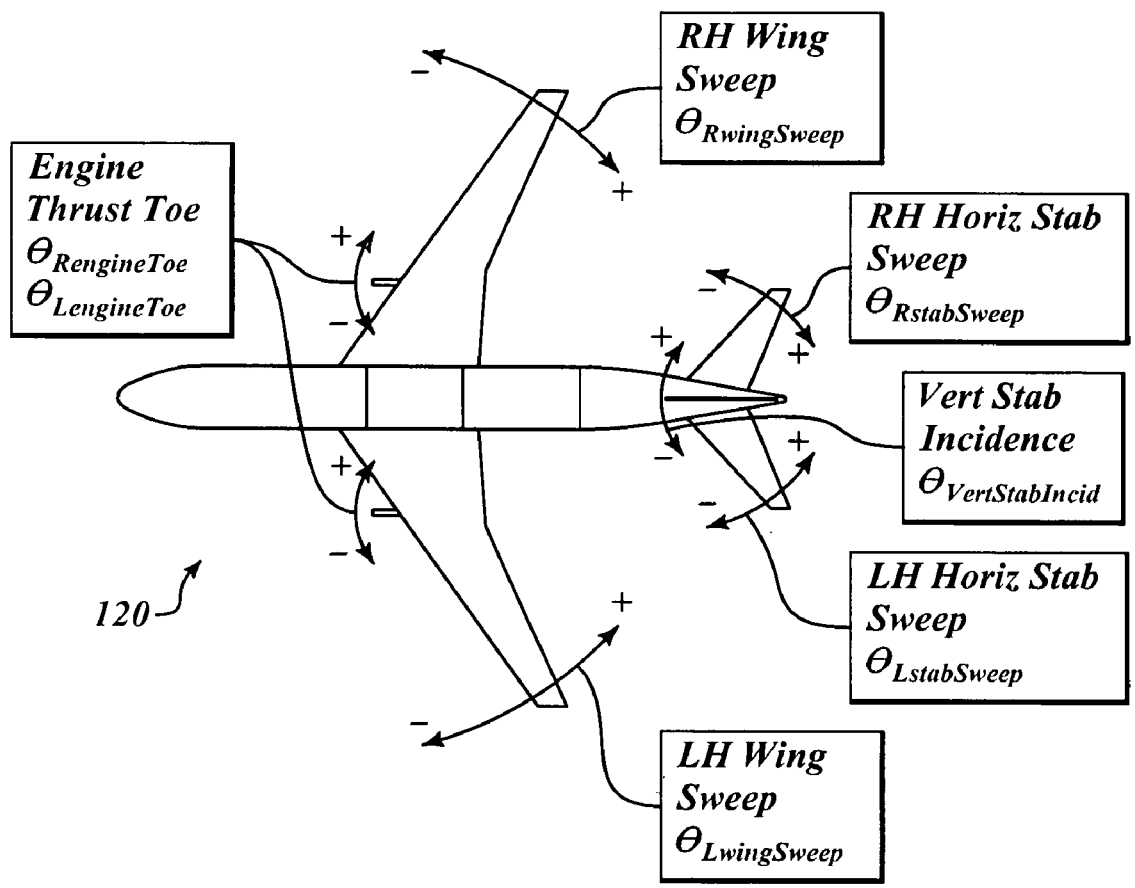
Figure 4E:
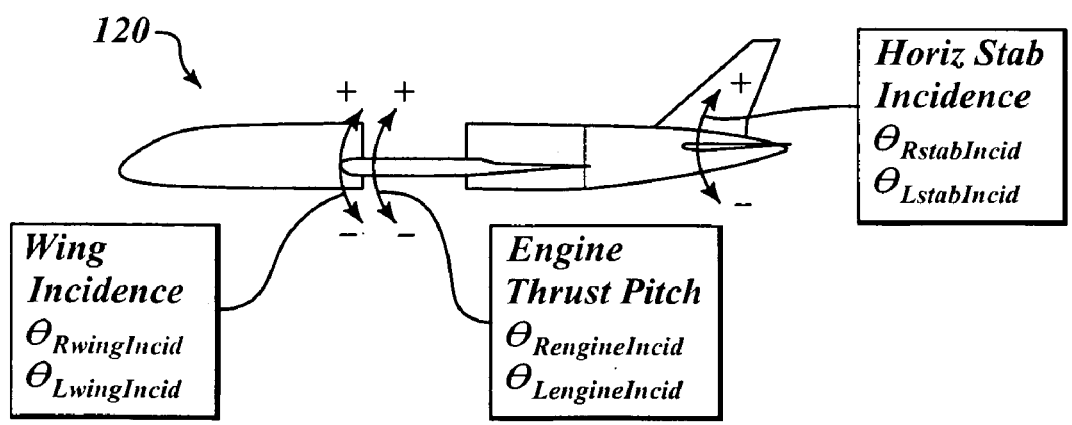

Referring additionally to FIG. 4E, angular variation can be input for any one or more of several aerodynamically significant features of the as-built airplane. In general, reliability of prediction of cruise orientation will increase as the number of aerodynamically significant features (and, therefore, their angular variations that are input) is increased. Illustrative angular variations that can be input are shown in relation to the as-built airplane 120 in FIG. 4E and are listed below in Table 1. Table 1 is not intended to be limiting. To that end, it will be appreciated that not all of the angular variations shown in Table 1 need be used. It will also be appreciated that other angular variations, such as without limitation angular variation of a fuselage nose or the like, may be used in lieu of or in addition to the angular variations shown in Table 1.

of an aerodynamically significant feature. To that end, the input vector d may be a column vector having rows equal in number to the considered aerodynamically significant features (for the example of Table 1, a 14×1 matrix).

Referring additionally to FIG. 4H, at the block 414 transformation factors that correlate angular variations of aerodynamically significant features with angular offsets of components of cruise orientation are formatted into a transformation matrix T. In some embodiments, the transformation matrix T suitably is a 3×14 matrix with rows corresponding to components of the cruise orientation (that is, angle of attack ($\alpha$), bank ($\phi$), and sideslip ($\beta$)) and columns corresponding to the aerodynamically significant features that are elements in the input vector d. To that end, the factors that populate the matrix

TABLE 1

| Input Variable | Input Variable Description |
| --- | --- |
| $\theta_{RwingIncid}$ | Variation from nominal in the rotation of the right wing about the y-axis |
| $\theta_{LwingIncid}$ | Variation from nominal in the rotation of the left wing about the y-axis |
| ABS ($\theta_{RwingIncid} - \theta_{LwingIncid}$) | Differential rotation between the right wing and the left wing about the y-axis ($\geq 0$) |
| $\theta_{RwingSweep}$ | Variation from nominal in the rotation of the right wing about the z-axis |
| $\theta_{LwingSweep}$ | Variation from nominal in the rotation of the left wing about the z-axis |
| $\theta_{RstabIncid}$ | Variation from nominal in the rotation of the right hand horizontal stabilizer half about the y-axis |
| $\theta_{LstabIncid}$ | Variation from nominal in the rotation of the left hand horizontal stabilizer half about the y-axis |
| $\theta_{RstabSweep}$ | Variation from nominal in the rotation of the right hand horizontal stabilizer half about the z-axis |
| $\theta_{LstabSweep}$ | Variation from nominal in the rotation of the left hand horizontal stabilizer half about the z-axis |
| $\theta_{VertStabIncid}$ | Variation from nominal in the rotation of the vertical stabilizer about the z-axis |
| $\theta_{RengineIncid}$ | Variation from nominal in the rotation of the right hand engine thrust vector about the y-axis |
| $\theta_{LengineIncid}$ | Variation from nominal in the rotation of the left hand engine thrust vector about the y-axis |
| $\theta_{RengineToe}$ | Variation from nominal in the rotation of the right hand engine thrust vector about the z-axis |
| $\theta_{LengineToe}$ | Variation from nominal in the rotation of the left hand engine thrust vector about the z-axis |

Figure 4F:
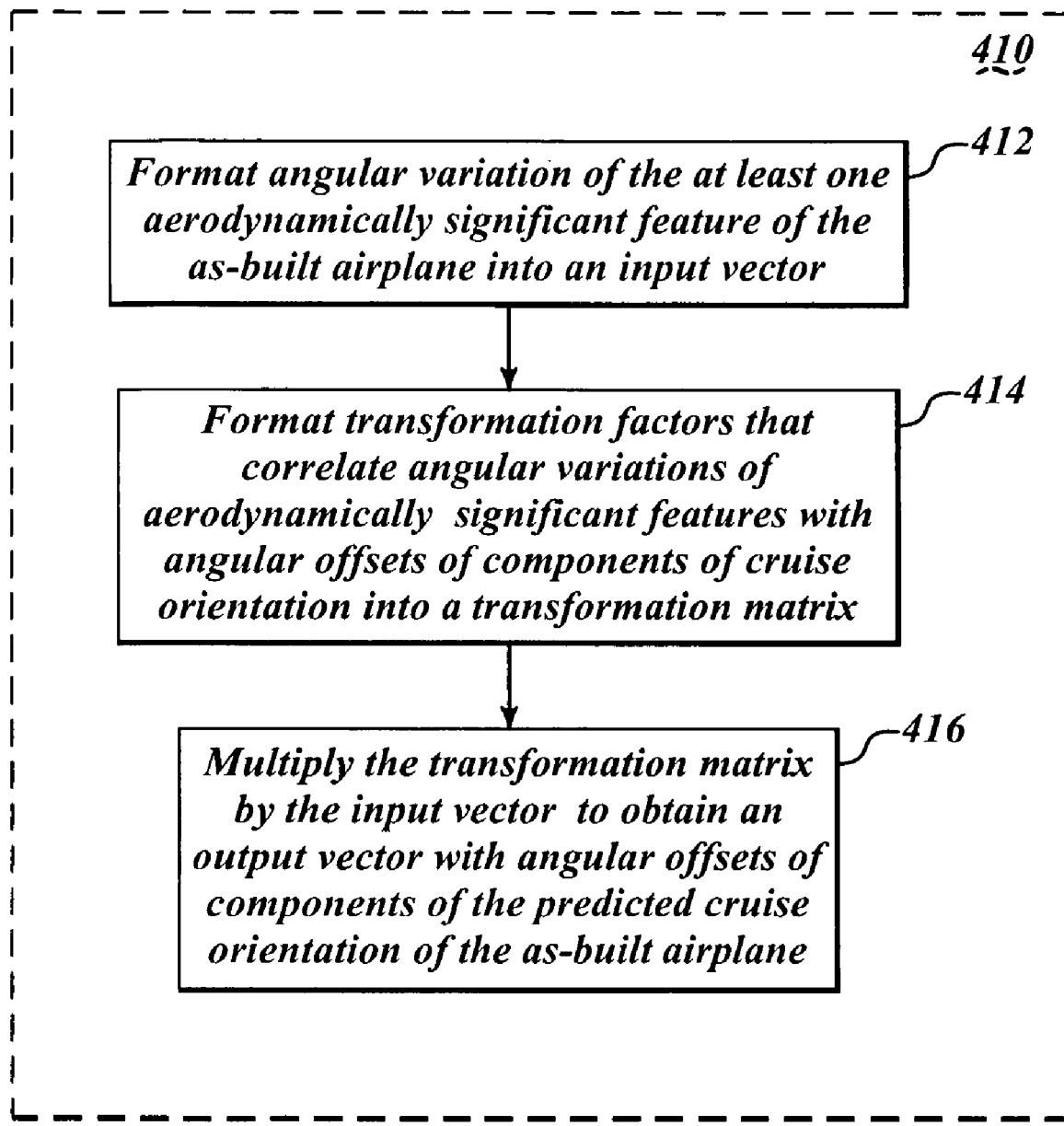

Referring additionally to FIG. 4F, processing within the block 410 to transform the angular variation entails further processes. At a block 412 the angular variation of the at least one aerodynamically significant feature of the as-built airplane is formatted into an input vector. At a block 414 transformation factors that correlate angular variations of aerodynamically significant features with angular offsets of components of cruise orientation are formatted into a transformation matrix. At a block 416 the transformation matrix is multiplied by the input vector to obtain an output vector with angular offsets of components of the predicted cruise orientation of the as-built airplane. Each of these processing blocks will be discussed below.

Referring additionally to FIG. 4G, at the block 412 the angular variation of the at least one aerodynamically significant feature of the as-built airplane is formatted into an input vector d. The input vector d suitably may include angular variation for as many of the input variables (that is, angular variation for an aerodynamically significant feature) as discussed above as desired for a particular application. However, as discussed above, reliability of prediction of cruise orientation will increase as the number of aerodynamically significant features (and, therefore, their angular variations that are input) is increased. Thus, the input vector suitably is a column vector in which each row corresponds to the angular variation suitably are the sensitivities of cruise orientation angles to the as-built orientation variation of the aerodynamically significant features.

Figure 4I:
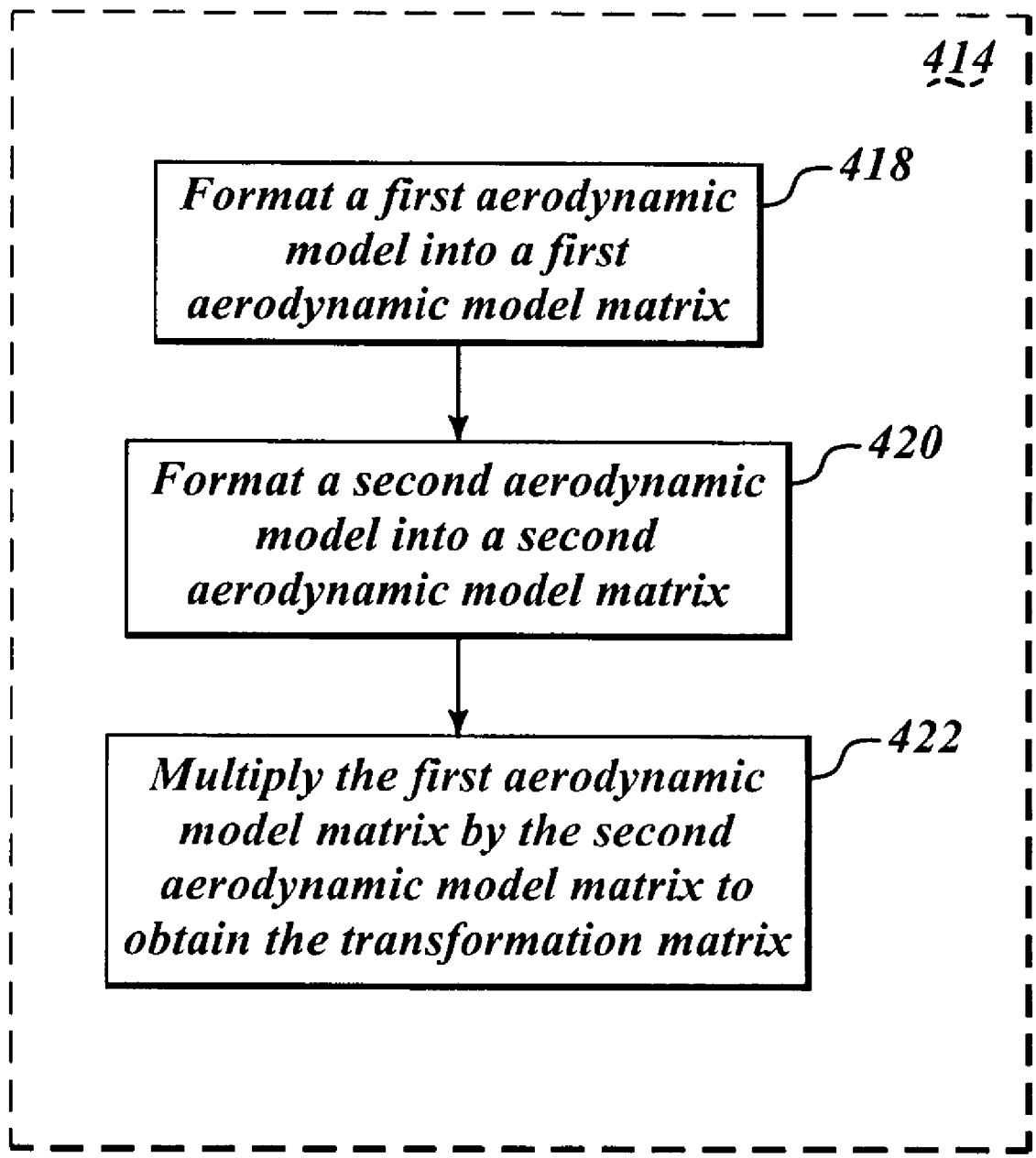

Referring additionally to FIG. 4I, formatting the transformation factors into the transformation matrix T at the block 414 entails additional processing. At a block 418 a first aerodynamic model is formatted into a first aerodynamic model matrix and at a block 420 a second aerodynamic model is formatted into a second aerodynamic model matrix. At a block 422 the first aerodynamic model matrix is multiplied by the second aerodynamic model matrix, thereby obtaining the transformation matrix T.

Referring additionally to FIG. 4J, in some embodiments the first aerodynamic model matrix suitably is an aerodynamic model matrix F that is populated with values of force and moment contributions due to variations in alignment of an aerodynamically significant feature that result from a linearization of a computational fluid dynamics (CFD) analysis of an aerodynamic model of the airplane. However, it will be appreciated that the analysis need not be linearized. Given by way of non-limiting example, the CFD analysis may be a sensitivity analysis. Any suitable CFD computing tool, such as without limitation Tranair or the like, may be used as desired. Columns of the aerodynamic model matrix F suitably correspond to the angular offsets of the aerodynamically significant features that are elements in the input vector d. Rows of the aerodynamic model matrix F suitably correspond to forces and moments analyzed in the aerodynamic model, such as angle of attack moment AoA, a force $F_y$, a moment $M_x$, and a moment $M_z$. In such embodiments, the aerodynamic model matrix F is a 4×14 matrix.

In some embodiments the second aerodynamic model matrix suitably is an aerodynamic model matrix A that is populated with values of calculated forces and moments that result from a linearization of an analysis of response to perturbations of the forces and moments included in the aerodynamic model matrix F. However, it will be appreciated that the analysis need not be linearized. Given by way of non-limiting example, the response may be a control response. Any suitable computing tool, such as without limitation PSIM or the like, may be used as desired. Columns of the aerodynamic model matrix A suitably correspond to the angle of attack moment AoA, the force $F_y$, the moment $M_x$, and the moment $M_z$. Rows of the aerodynamic model matrix A suitably correspond to changes in angle of attack AoA, changes in bank, and changes in sideslip. In such embodiments, the aerodynamic model matrix A is a 3×4 matrix.

Thus, at the block 416 the aerodynamic model matrix F is multiplied by the aerodynamic model matrix A according to the relationship T=A×F. In embodiments when the 4×14 aerodynamic model matrix F (FIG. 4J) is multiplied by the 3×4 aerodynamic model matrix A (FIG. 4J) at the block 416, then the 3×14 transformation matrix T (FIG. 4H) results.

Referring additionally to FIGS. 4K and 4L, in some other embodiments it may be desirable additionally to consider aerodynamic forces and moments due to angular variation of the rudder. In such embodiments the aerodynamic model matrix F is the same 4×14 matrix shown in FIG. 4J. However, in such embodiments the aerodynamic model matrix A is a 4×4 matrix. The top three rows of the aerodynamic model matrix A used in these embodiments are the same as those shown in FIG. 4J. However, the aerodynamic model matrix A used in these embodiments includes a fourth row that corresponds to force and moment changes due to angular variation of the rudder. In such embodiments when the 4×14 aerodynamic model matrix F (FIG. 4K) is multiplied by the 4×4 aerodynamic model matrix A (FIG. 4K) at the block 416, then a 4×14 transformation matrix T (FIG. 4L) results. The top three rows of the 4×14 transformation matrix T (FIG. 4L) are the same as the three rows in the 3×14 transformation matrix T (FIG. 4J). The fourth row of the 4×14 transformation matrix T (FIG. 4L) corresponds to changes in rudder angle to realign the airplane from nominal orientation to its as-built, predicted cruise orientation.

After the transformation matrix T has been obtained according to the relationship T=A×F, at the block 416 the transformation matrix T is multiplied by the input vector d according to the relationship O=T×d to obtain an output vector O with angular offsets of components of the predicted cruise orientation of the as-built airplane. In embodiments in which the 3×4 aerodynamic model matrix A (FIG. 4J) is used to obtain the 3×14 transformation matrix T (FIG. 4H), the output vector O is a 3×1 column vector with rows corresponding to angular offset of pitch angle or angle of attack ($\alpha_M$), angular offset of sideslip angle ($\beta_M$), and angular offset of roll angle or bank angle ($\phi_M$). In embodiments in which the 4×4 aerodynamic model matrix A (FIG. 4K) is used to obtain the 4×14 transformation matrix T (FIG. 4L), the output vector O is a 4×1 column vector with rows corresponding to angular offset of pitch angle or angle of attack ($\alpha_M$), angular offset of sideslip angle ($\beta_M$), angular offset of roll angle or bank angle ($\phi_M$), and angular offset of rudder to realign the airplane from nominal orientation to its as-built, predicted cruise orientation.

Illustrative System

Figure 5:
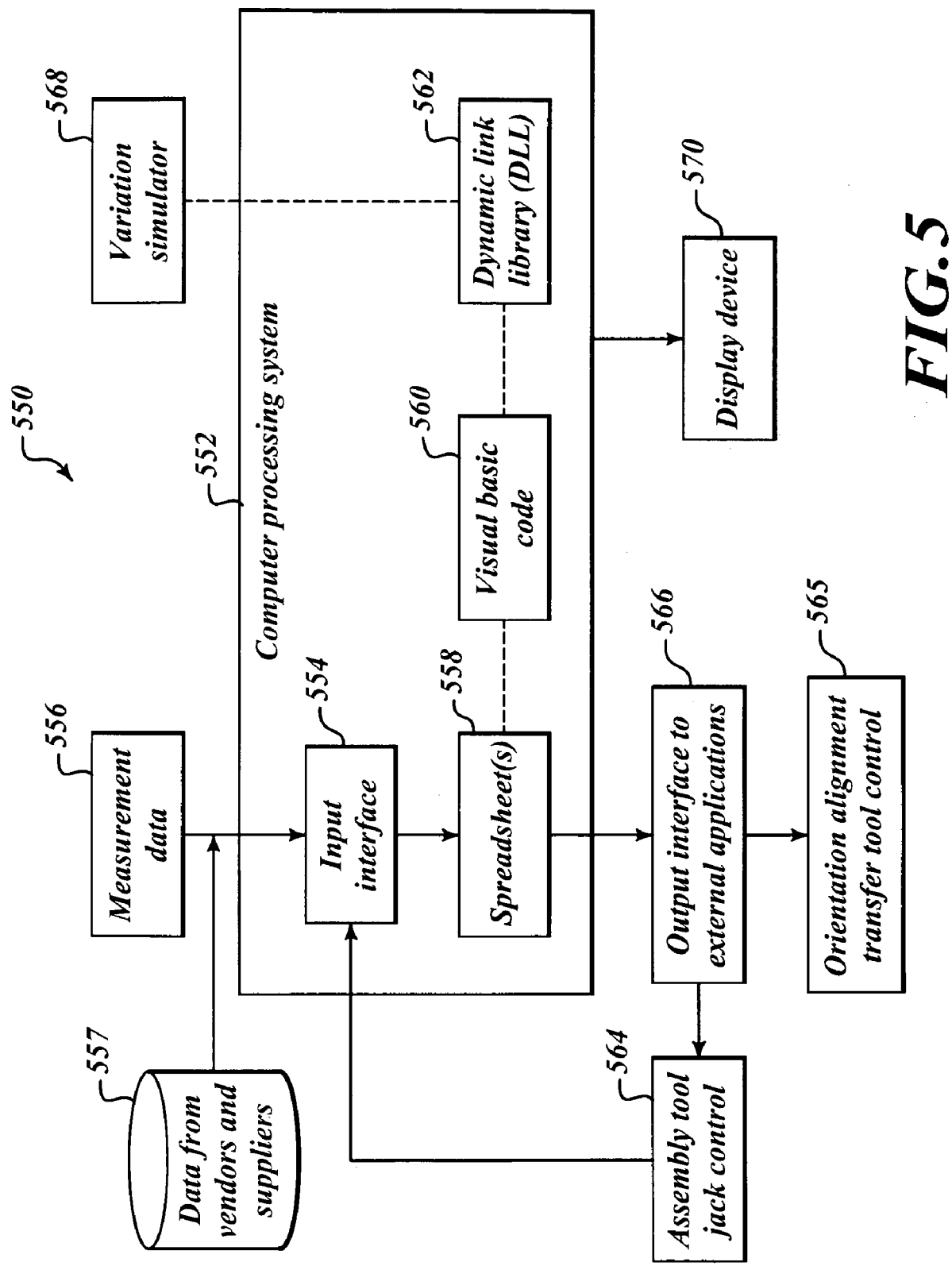
FIG. 5 is a block diagram of an illustrative system for computing assembly jack locations to align parts for assembly, computing orientation alignment transfer tool locations, and predicting cruise orientation.

Referring now to FIG. 5, a system 550 is provided for computing orientation alignment transfer tool location and for predicting cruise orientation. A computer processing system 552 includes an input interface 554. Measurement data 556 regarding initial position of parts for alignment and initial position of the orientation alignment transfer tool is provided to the input interface 554. Predetermined data 557 regarding the as-built positions of the points of the aerodynamically significant features, typically obtained from vendors and/or suppliers of the aerodynamically significant features, is also provided to the input interface 554. The predetermined data 557 may be in the form of point data.

In an illustrative embodiment, computer processing components of the computer processing system execute one or more spreadsheets 558, visual basic code 560, and routines from a dynamic link library 562. The spreadsheet 558 receives from the measurement system via the input interface 554 initial position measurement data from which the initial locations of the components to be assembled can be determined and from which initial location of the orientation alignment transfer tool can be determined. The spreadsheet 558 also receives from the input interface 554 the predetermined data 557 regarding the as-built positions of the points of the aerodynamically significant features. The spreadsheet 558 passes the resulting optimal assembly jack positions to external applications, such as without limitation an assembly jack control 564 or other external processes as desired, via an output interface 566. The spreadsheet 558 predicts cruise orientation and also passes computed orientation alignment transfer tool positions to an orientation alignment transfer tool control 565 via the output interface 566. The spreadsheet 558 receives feedback from the jack assembly control 564 via the input interface 554 on the actual locations of the jacks at final set.

In some embodiments, the spreadsheet computations can be divided into several separate spreadsheets as desired for a particular purpose. However, in some other embodiments the spreadsheet computations can be performed by a single spreadsheet. For purposes of clarity, the one or more spreadsheets 558 are referred to herein as the spreadsheet 558.

To perform its calculations, in some embodiments the spreadsheet 558 performs computations that use a mixture of spreadsheet formulas, the visual basic code 560 written in the Visual Basic for Applications (VBA) computer language (which is embedded in the spreadsheet 558), and the dynamic link library (DLL) 562 containing complex numerical computations which are implemented in the C computer language. If desired, the C code in turn also can be used by an upstream variation simulation process in a variation simulator 568. The purpose of this is to simulate the assembly effects of variation in individual parts to perform variation management trade studies during the engineering design phase. The sharing of numerical algorithms and software between the engineering design and factory assembly stages enables the factory assembly process to be the same process that was simulated during engineering design studies.

A display device 570 is operatively coupled to the computer processing system 552 to display motions. As discussed above, Euler angles suitably are used to communicate information about rotations to assembly mechanics on the factory floor.

Referring now to FIGS. 6A-6H, illustrative screen shots show processing performed by the spreadsheet 558 (FIG. 5) in illustrative embodiments. Given by way of non-limiting example, the screen shots illustrate processing of data for assembling an aircraft from fuselage sections, predicting cruise orientation, and computing orientation alignment transfer tool locations. For purposes of clarity, the screen shots illustrate a simplified assembly scenario in which (i) all major assemblies (that is, fuselage sections) are in their nominal positions on the factory floor except the aft section of the fuselage (referred to below as section 47) and (ii) all key features are at nominal orientation relative to their respective major assemblies except the vertical fin (an aerodynamically significant feature that is attached to the aft fuselage section). It will be appreciated that all numerical data shown on the screenshots are notional, and bear no relation to actual product data. It will also be appreciated that data regarding other aerodynamically significant features discussed above can be used in the illustrated computations. However, for the sake of brevity, only those computations regarding the vertical fin are discussed.

Figure 6A:
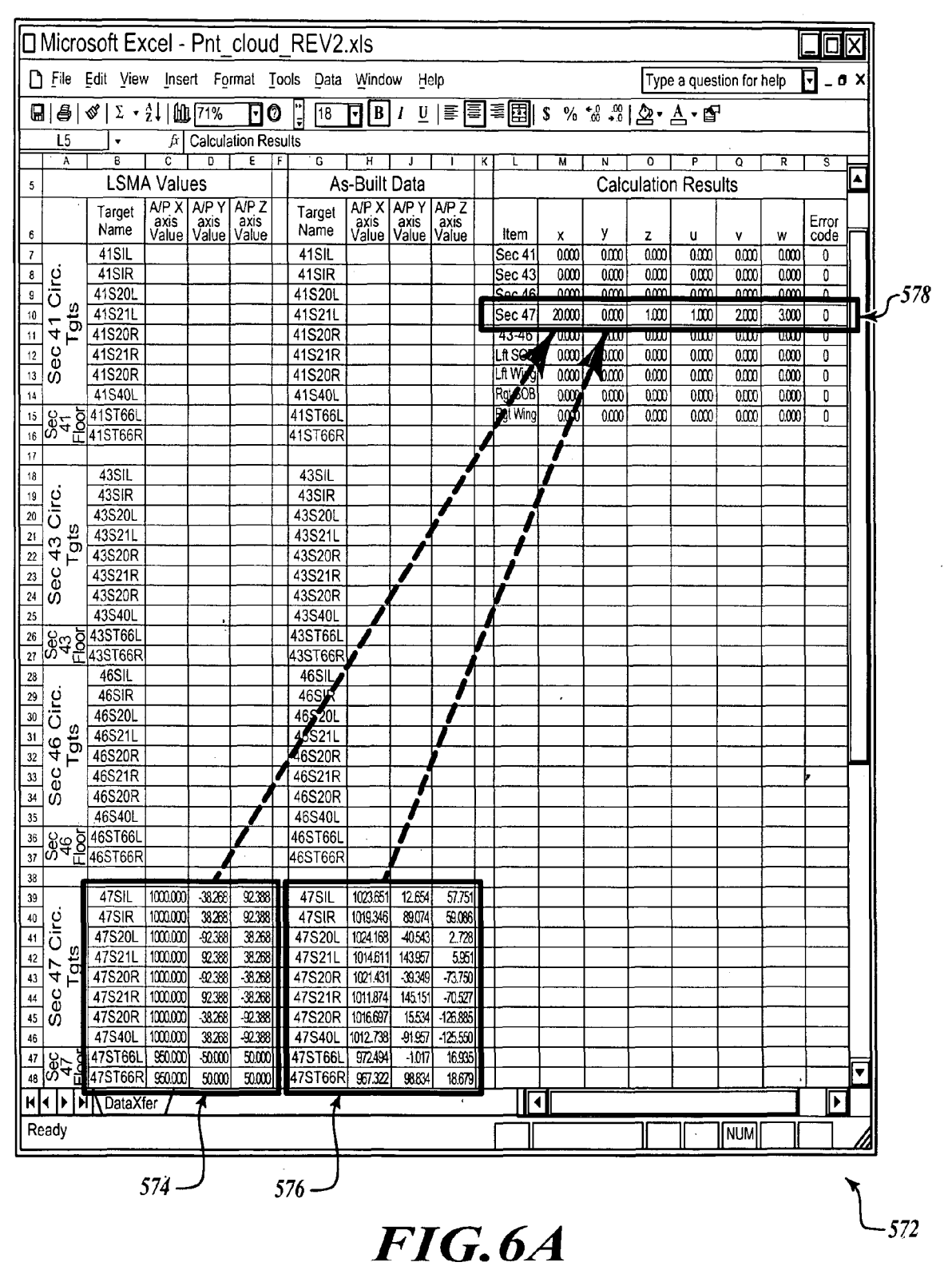

Referring now to FIG. 6A, in a screen 572 cells 574 are populated with initial position measurement data 556 (FIG. 5) from the measurement system via the input interface 554 (FIG. 5) for ten target points on section 47, thereby executing processing of the block 114 (FIG. 2A). Data regarding nominal locations of the ten target points on section 47 are populated in cells 576. The measured data from the cells 574 and the nominal data from the cells 576 are combined to compute the initial location and orientation of section 47 with respect to the factory coordinate system, thereby executing processing of the block 116 (FIG. 2A). Given by way of non-limiting example, the point cloud registration method was used to combine the measured data from the cells 574 and the nominal data from the cells 576 to compute the initial location and orientation of section 47 with respect to the factory coordinate system. Resulting data for initial location and orientation of section 47 are populated in cells 578.

Figure 6B:
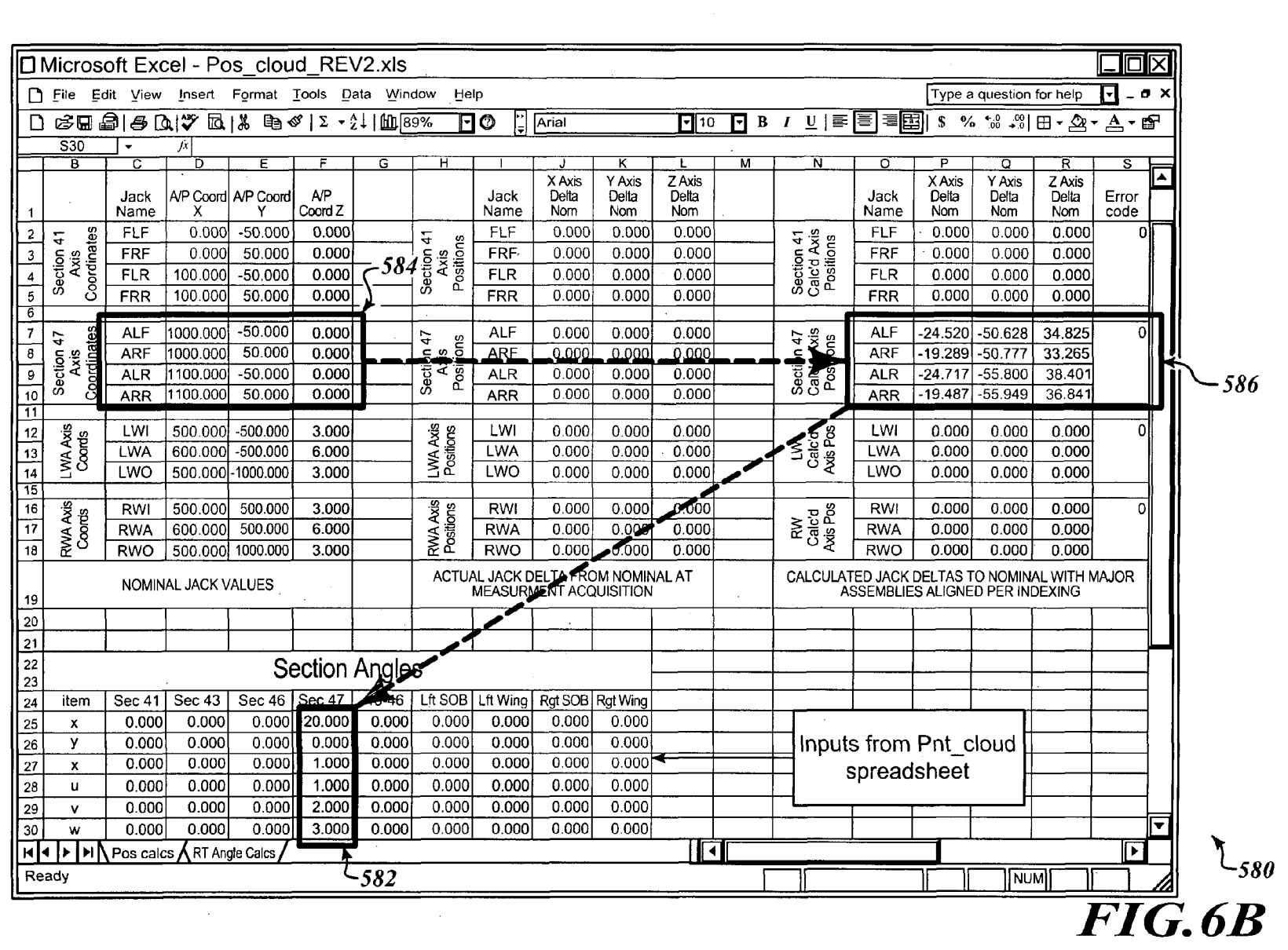

Referring now to FIG. 6B, in a screen 580 the data regarding location and orientation of section 47 from the cells 578 (FIG. 6A) are populated in cells 582. The data regarding location and orientation of section 47 from the cells 582 is combined with data in cells 584 regarding nominal assembly jack locations to produce desired assembly jack deltas (that is, displacements) to bring section 47 into, alignment with the stationary fuselage section 46 (which is already in nominal location and alignment), thereby executing processing of the block 132 (FIG. 2A). These jack displacements bring section 47 into its optimal set position. Data regarding the jack displacements populate cells 586.

Figure 6C:
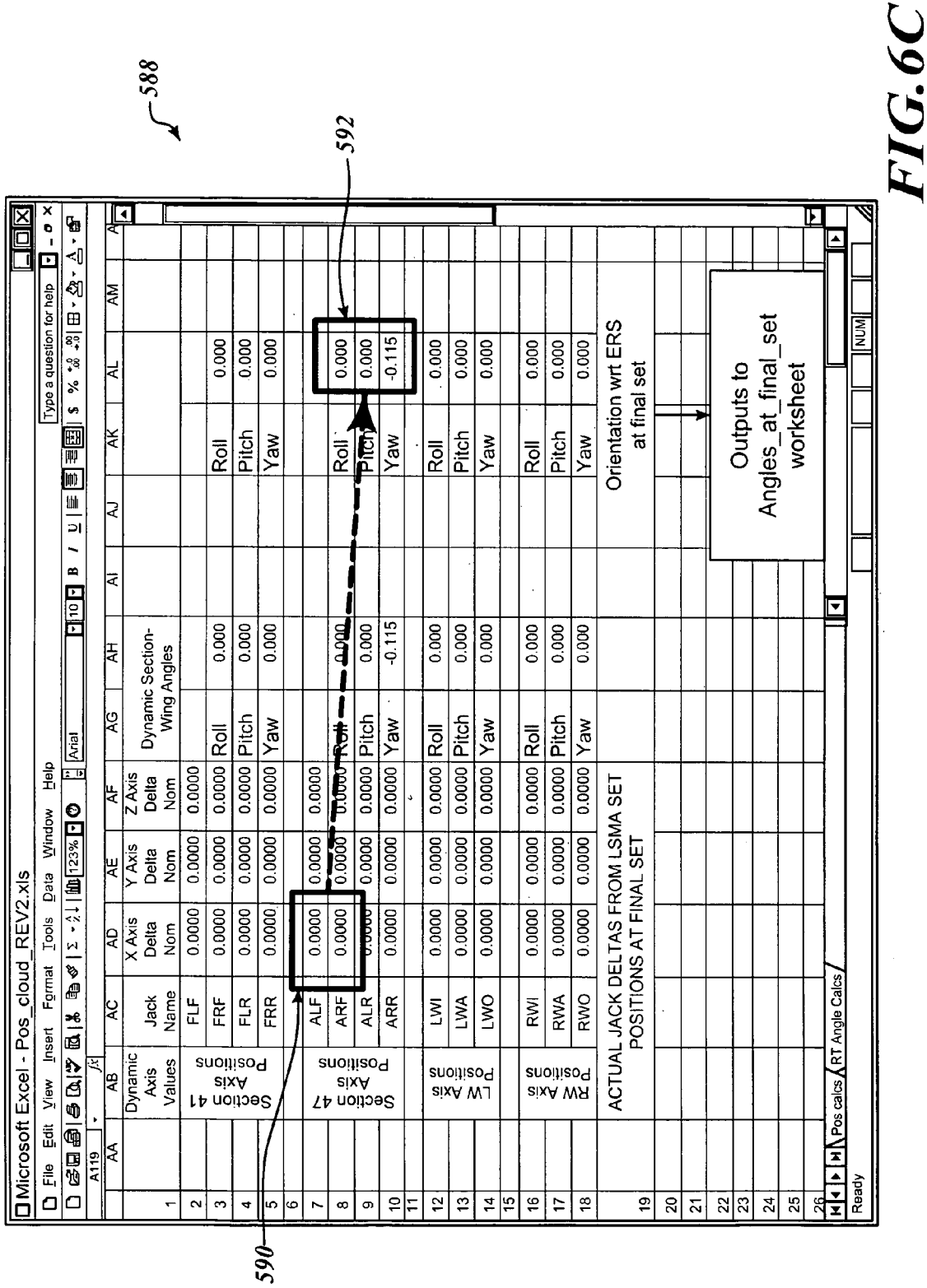

Referring now to FIG. 6C, in a screen 588 data regarding actual assembly jack deltas introduced by assembly mechanics in moving from the optimal set to final set populates cells 590, thereby executing processing of the blocks 142 and 144 (both FIG. 2A). The data from the cells 590 is used to compute section 47's orientation at final set, thereby executing processing of the block 138 (FIG. 2A). Resulting data regarding section 47's orientation at final set populates cells 592.

At this point (final set), the major airplane sections have been assembled and the resultant assembled structure is referred to as an as-built airplane. Now that the airplane has been assembled, some measurement data taken to assemble the airplane and some computations made in assembling the airplane are used to compute orientation alignment transfer tool locations.

Figure 6D:
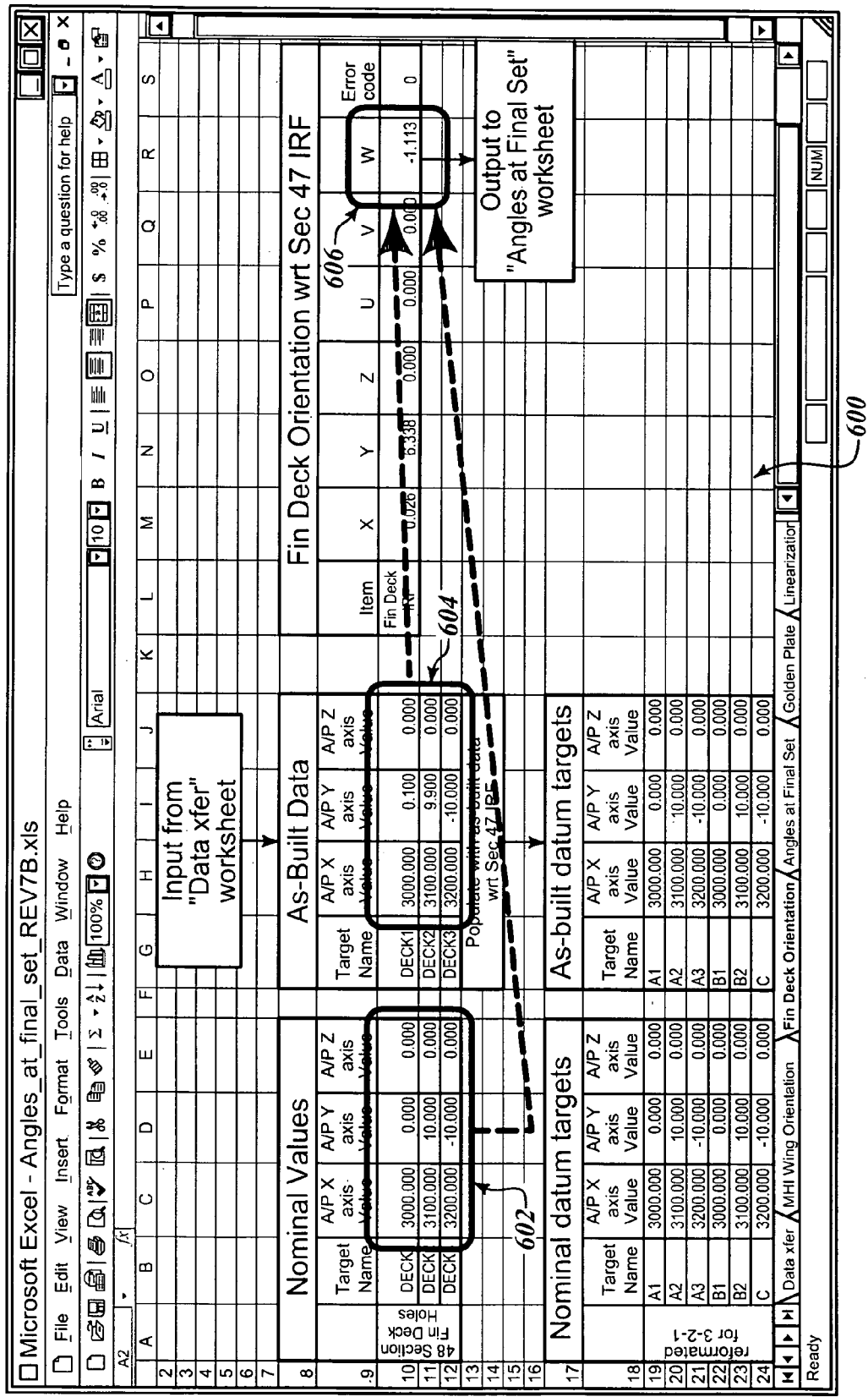
FIGS. 6D-6H are screen shots of an illustrative, non-limiting implementation of computing orientation alignment transfer tool locations.

Referring now to FIG. 6D, nominal and measured locations of points on the fin deck are used to compute actual as-built orientation of the vertical fin with respect to section 47, thereby executing processing of the block 26 (FIGS. 1B and 1C). In a screen 600 the predetermined data 557 (FIG. 5) regarding the as-built positions of the points of the aerodynamically significant feature (in this case, the fin deck) populates cells 602, thereby executing processing of the block 30 (FIG. 1C). The measurement data 556 (FIG. 5) regarding measured locations of points on the fin deck populates cells 604, thereby executing processing of the block 32 (FIG. 1C). The data from the cells 602 and 604 are used by a point cloud registration method or a datum target registration method, as desired, to compute the as-built orientation of the vertical fin with respect to section 47, thereby executing processing of the block 34 (FIG. 1C). Data regarding the computed, as-built orientation of the vertical fin with respect to section 47 populates a cell 606.

Figure 6E:
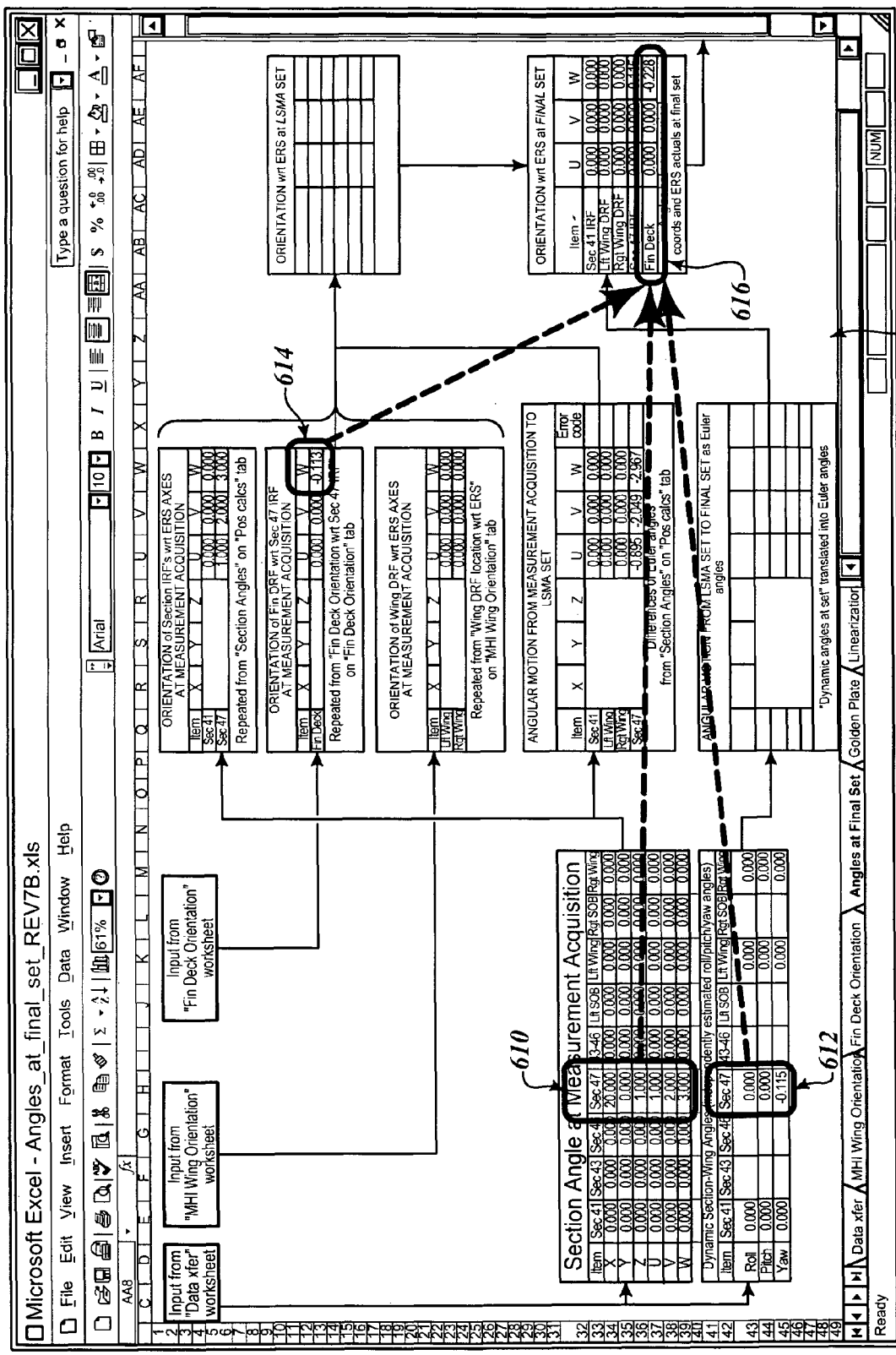

Referring now to FIG. 6E, initial location and orientation of section 47, orientation of section 47 at final set, and the computed, as-built orientation of the vertical fin with respect to section 47 are used to compute orientation of the fin deck at final set, thereby executing processing of the block 28 (FIGS. 1B and 1D). In a screen 608 data regarding initial location and orientation of section 47 populates cells 610, thereby executing processing of the block 36 (FIG. 1D). Data regarding orientation of section 47 at final set populates cells 612, thereby executing processing of the block 38 (FIG. 1D). Data regarding the computed, as-built orientation of the vertical fin with respect to section 47 populates a cell 614. Rigid motion is computed and applied using the data in the cells 610, 612, and 614 to compute the orientation of the fin deck at final set, thereby executing processing of the blocks 40 and 42 (FIG. 1D). Data regarding the computed orientation of the fin deck at final set populates cells 616.

Figure 6F:
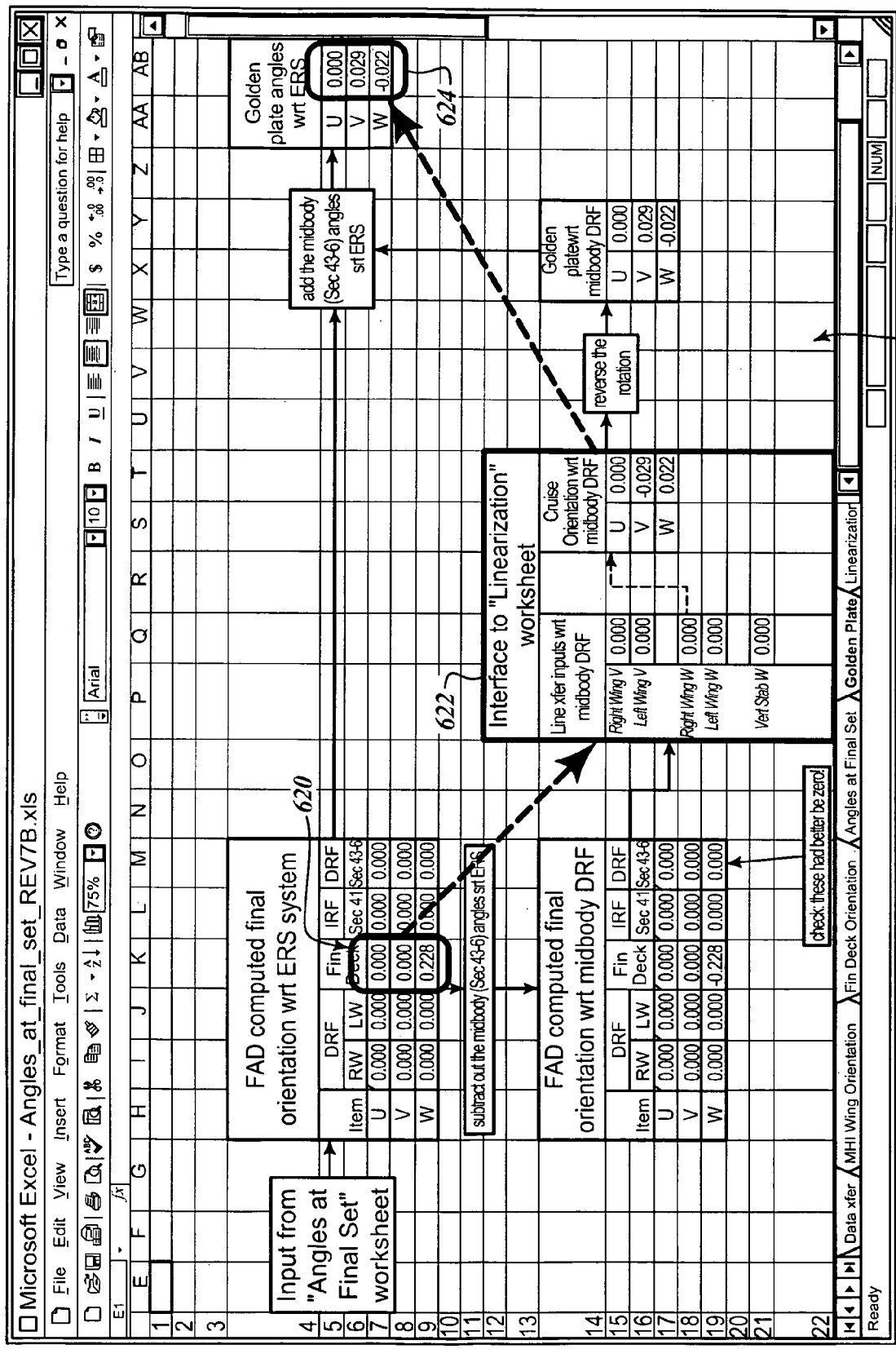

Referring now to FIG. 6F, fin deck orientation is fed into an aerodynamics model to produce orientation of the orientation monument. In a screen 618 data regarding orientation at final set of the aerodynamically significant features is entered, thereby executing processing of the block 44 (FIG. 1E). For example, data regarding orientation of the fin deck at final set populates cells 620. The data regarding orientation at final set of the aerodynamically significant features is provided to an interface 622 to an aerodynamics model that predicts cruise orientation, thereby executing processing of the block 46 (FIG. 1E). As shown in the screen 618, the predicted cruise orientation may be reversed to produce orientation of the orientation monument with respect to a reference frame of the section of the airplane in which the orientation monument is to be mounted, thereby executing processing of the block 52 (FIG. 1F). As also shown in the screen 618, orientation of the section of the airplane in which the orientation monument is to be mounted may be added to produce orientation of the orientation monument with respect to a reference frame of the facility in which the orientation alignment transfer tool is used, thereby executing processing of the block 54 (FIG. 1F). The predicted orientation of the orientation monument populates cells 624.

Figure 6G:
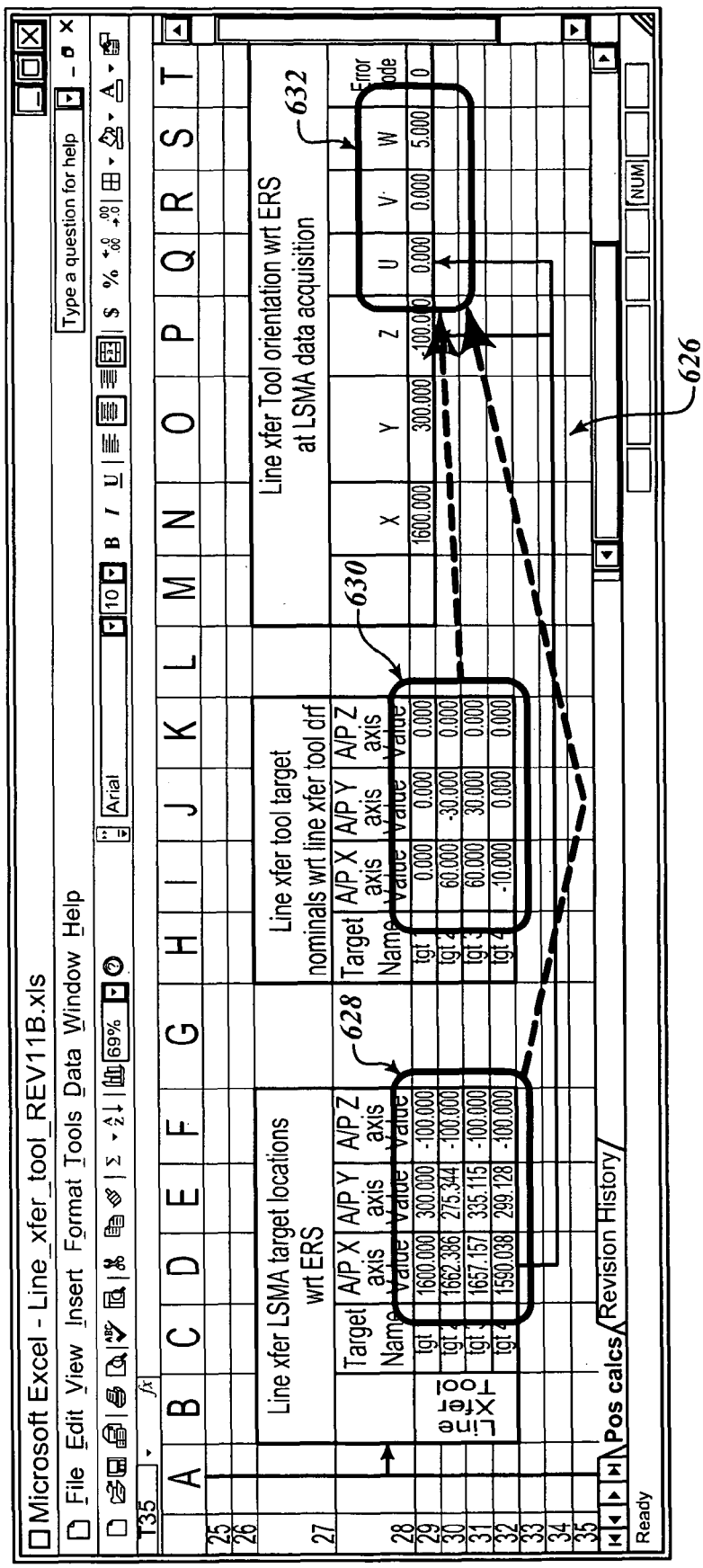

Referring now to FIG. 6G, initial orientation of the orientation alignment transfer tool is computed, thereby executing processing of the block 56 (FIG. 1G). In a screen 626 the measurement data 556 of initial location of targets located on the orientation alignment transfer tool populates cells 628. Nominal locations of the targets located on the orientation alignment transfer tool populates cells 630. Initial orientation of the orientation alignment transfer tool is computed from the data in the cells 628 and 630 using the datum registration method. Data regarding initial orientation of the orientation alignment transfer tool populates cells 632.

Figure 6H:
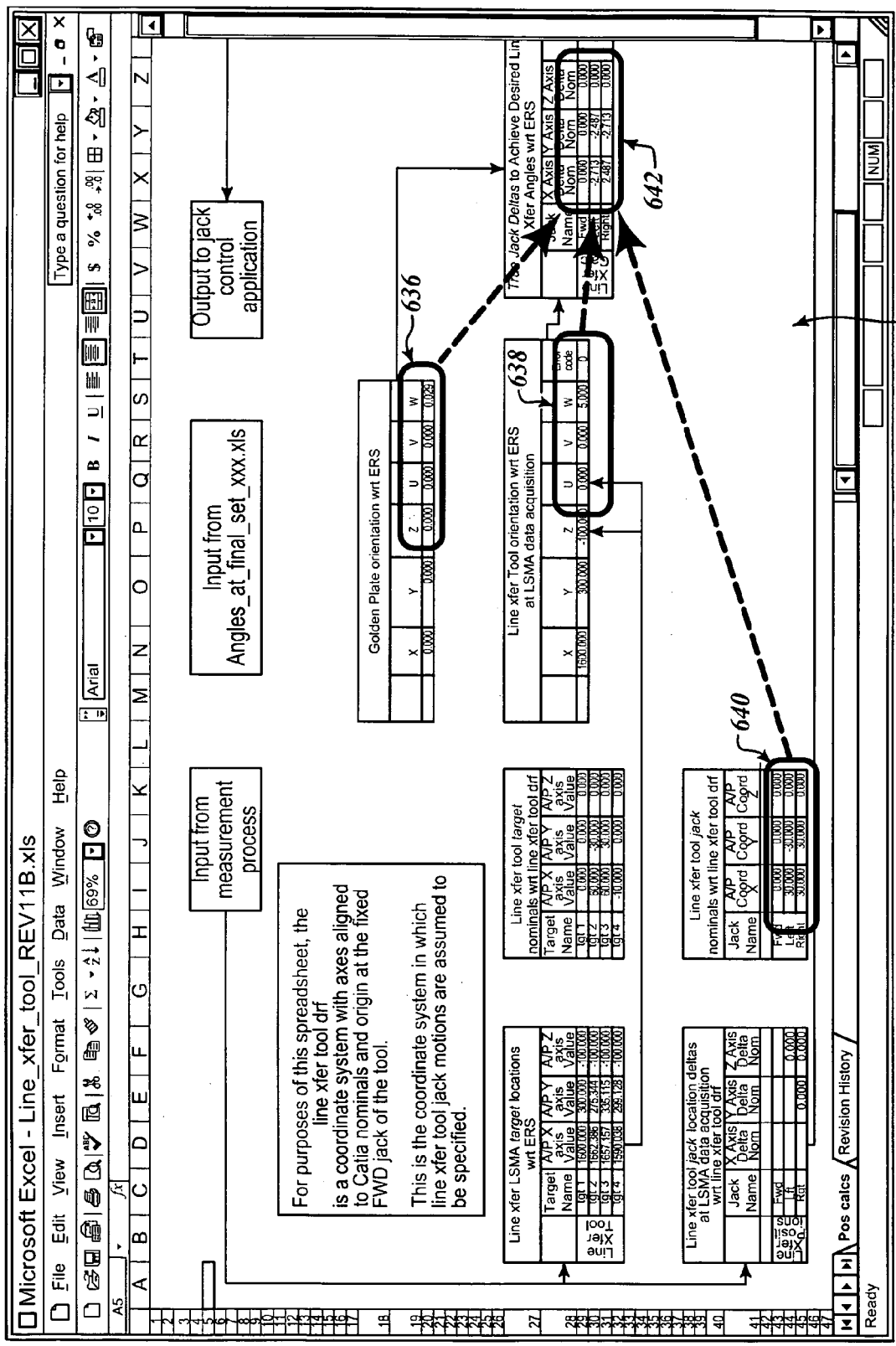

Referring now to FIG. 6H, motion is computed to align the orientation alignment transfer tool to orientation of the orientation monument, thereby executing processing of the block 18 (FIGS. 1A and 1G). In a screen 634 the predicted orientation of the orientation monument from the cells 624 (FIG. 6F) populates cells 636. The data regarding initial orientation of the orientation alignment transfer tool from the cells 632 (FIG. 6G) populates cells 638. Displacements are determined between the initial orientation of the orientation alignment transfer tool and the predicted orientation of the orientation monument, thereby executing processing of the block 60 (FIG. 1G). Data regarding initial location of the orientation alignment transfer tool populates cells 640. Rigid motion is determined to effect the displacements (computed from the data in the cells 636 and 638) from the initial location of the orientation alignment transfer tool (from the data in the cells 640), thereby executing processing of the block 62 (FIG. 1G). Data regarding deltas that describe the determined motion populate cells 642.

In various embodiments, portions of the system and method include a computer program product. The computer program product includes a computer-readable storage medium, such as a non-volatile storage medium, and computer-readable program code portions, such as a series of computer instructions, embodied in the computer-readable storage medium. Typically, the computer program is stored and executed by a processing unit or a related memory device, such as processing components of the computer processing system 552 depicted in FIG. 5.

In this regard, FIGS. 1A-1G, 2A-2E, 4A, 4D, 4F, 4I, 5, and 6A-6H are flowcharts and control flow illustrations, block diagrams, and screen shots, respectively, of methods, systems, and program products, respectively, according to various embodiments. It will be understood that each block of the block diagram, flowchart and control flow illustrations, and combinations of blocks in the block diagram, and flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s).

Accordingly, blocks of the block diagram, flowchart or control flow illustrations support combinations of means for performing the specified functions, combinations of steps for performing the specified functions and program instruction means for performing the specified functions. It will also be understood that each block of the block diagram, flowchart or control flow illustrations, and combinations of blocks in the block diagram, flowchart or control flow illustrations, can be implemented by special purpose hardware-based computer systems which perform the specified functions or steps, or combinations of special purpose hardware and computer instructions.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A computer executable method for computing orientation alignment transfer tool location, the method comprising:
at a computer processing system having an input interface and an output interface:
receiving as-built location data of one or more points on at least one aerodynamically significant feature in an as-built airplane via the input interface;
automatically determining orientation of at least one aerodynamically significant feature of an as-built airplane;
predicting cruise orientation for the as-built airplane from the orientation of the at least one aerodynamically significant feature in the as-built airplane;
automatically determining orientation of an orientation monument for the as-built airplane from the predicted cruise orientation for the as-built airplane;
automatically determining motion to align an orientation alignment transfer tool with the determined orientation of the orientation monument; and
presenting the determined motion at the output interface.

2. The method of claim 1, wherein:
the at least one aerodynamically significant feature is part of at least one respective component of the as-built airplane; and
automatically determining orientation of at least one aerodynamically significant feature of an as-built airplane includes:
automatically computing orientation of the at least one aerodynamically significant feature with respect to the respective component; and
automatically computing the orientation of the at least one aerodynamically significant feature in the as-built airplane based on the orientation of the at least one aerodynamically significant feature with respect to the respective component.

3. The method of claim 2, wherein automatically computing the orientation of the at least one aerodynamically significant feature with respect to its respective component includes:
receiving predetermined as-built locations of a plurality of points of the at least one aerodynamically significant feature;
receiving measured locations of the plurality of points of the at least one aerodynamically significant feature; and
computing a location of the at least one aerodynamically significant feature with respect to assembly interfaces of the component.

4. The method of claim 3, wherein automatically computing the orientation of the at least one aerodynamically significant feature in the as-built airplane based on the orientation of the at least one aerodynamically significant feature with respect to its respective component:

receiving via the input interface an initial location and orientation of at least one component with at least one aerodynamically significant feature;

receiving via the input interface a final orientation in an as-built airplane of the at least one component with at least one aerodynamically significant feature;

automatically computing motion of the at least one component with at least one aerodynamically significant feature from initial location of the at least one component with at least one aerodynamically significant feature to final orientation in the as-built airplane of the at least one component with at least one aerodynamically significant feature; and automatically applying to the at least one aerodynamically significant feature the motion computed for the at least one component with at least one aerodynamically significant feature.

5. The method of claim 1, wherein automatically computing the orientation of the orientation monument for the as-built airplane from predicted cruise orientation for the as-built airplane includes:

receiving the predicted cruise orientation;

reversing rotation of the predicted cruise orientation; and adding orientation angles of a section of the as-built airplane in which the orientation monument is to be installed.

6. The method of claim 1, wherein automatically determining motion to align an orientation alignment transfer tool with the determined orientation of the orientation monument includes:

automatically determining initial orientation of the orientation alignment transfer tool;

receiving the determined orientation of the orientation monument;

automatically determining a displacement between the initial orientation of the orientation alignment transfer tool and the determined orientation of the orientation monument; and automatically determining motion of the orientation alignment transfer tool to achieve the displacement.

7. The method of claim 1, wherein presenting output data at the output interface displaying the determined motion.

8. The method of claim 1, wherein presenting output data at the output device outputting the determined motion to the orientation alignment transfer tool.

9. The method of claim 1, further comprising, in response to determining that the orientation of the at least one aerodynamically significant feature in the as-built airplane is to be changed:

determining a motion to be imparted to the at least one aerodynamically significant feature; and determining a displacement of one or more jacks providing support to the at least one aerodynamically significant feature to impart the motion to the at least one aerodynamically significant feature.

10. The method of claim 1, wherein predicting the cruise orientation for the as-built airplane from the orientation of the at least one aerodynamically significant feature in the as-built airplane includes:

receiving angular variation of the at least one aerodynamically significant feature of the as-built airplane relative to a nominal orientation of the as-built airplane; and transforming the angular variation of the at least one aerodynamically significant feature of the as-built airplane into angular offsets of the nominal orientation of the as-built airplane.

11. The method of claim 10, wherein transforming the angular variation of the at least one aerodynamically significant feature of the as-built airplane into the angular offsets of the nominal orientation of the as-built airplane includes:

formatting the angular variation of the at least one aerodynamically significant feature of the as-built airplane into an input vector;

formatting transformation factors that correlate angular variations of the at least one aerodynamically significant feature with angular offsets of components of the cruise orientation into a transformation matrix; and multiplying the transformation matrix by the input vector to obtain an output vector with angular offsets of components of the predicted cruise orientation of the as-built airplane.

12. A system for computing orientation alignment transfer tool location, the system comprising:

an input interface configured to receive:

measurement data regarding initial location of:

a plurality of components of an as-built airplane, the plurality of components including at least one component having at least one aerodynamically significant feature; and at least one aerodynamically significant feature; and a computer processor operatively coupled to the input interface, the computer processor including:

a first computer processing component configured to automatically determine orientation of at least one aerodynamically significant feature of the as-built airplane;

a second computer processing component configured to automatically determine orientation of an orientation monument for the as-built airplane from the determined orientation of the at least one aerodynamically significant feature of the as-built airplane, wherein the second computer processing component includes:

a third computer processing component configured to predict cruise orientation for the as-built airplane from the orientation of the at least one aerodynamically significant feature in the as-built airplane; and a fourth computer processing component configured to compute orientation of the orientation monument for the as-built airplane from the predicted cruise orientation for the as-built airplane; and a fifth computer processing component configured to automatically determine motion to align an orientation alignment transfer tool with the determined orientation of the orientation monument.

13. The system of claim 12, wherein the first computer processing component includes:

a sixth computer processing component configured to compute orientation of the at least one aerodynamically significant feature with respect to its respective component; and a seventh computer processing component configured to compute the orientation of the at least one aerodynamically significant feature in the as-built airplane based on the orientation of the at least one aerodynamically significant feature with respect to its respective component.

14. The system of claim 13, wherein:

the input interface is further configured to receive:

predetermined as-built locations of a plurality of points of the at least one aerodynamically significant feature; and measured locations of the plurality of points of the at least one aerodynamically significant feature; and wherein the sixth computer processing component includes:
an eighth computer processing component configured to compute nominal location of the at least one aerodynamically significant feature with respect to assembly interfaces of the component.

15. The system of claim 14, wherein the seventh computer processing component includes:
a ninth computer processing component configured to compute motion of the at least one component with at least one aerodynamically significant feature from initial location of the at least one component with at least one aerodynamically significant feature to final orientation in the as-built airplane of the at least one component with at least one aerodynamically significant feature; and
a tenth computer processing component configured to apply to the at least one aerodynamically significant feature the motion computed for the at least one component with at least one aerodynamically significant feature.

16. The system of claim 12, wherein the fourth computer processing component includes:
an eleventh computer processing component configured to reverse rotation of the predicted cruise orientation; and
a twelfth computer processing component configured to add orientation angles of a section of the as-built airplane in which the orientation monument is to be installed.

17. The system of claim 12, wherein the fifth computer processing component includes:
a thirteenth computer processing component configured to determine initial orientation of the orientation alignment transfer tool;
a fourteenth computer processing component configured to determine a displacement between the initial orientation of the orientation alignment transfer tool and the determined orientation of the orientation monument; and
a fifteenth computer processing component configured to determine motion of the orientation alignment transfer tool to achieve the displacement.

18. The system of claim 12, further comprising a display device operatively coupled to the computer processor.

19. The system of claim 12, further comprising an output interface operatively coupled to the computer processor and configured to provide the determined motion to the orientation alignment transfer tool.

20. A computer-readable storage medium, wherein the computer-readable storage medium includes a tangible medium storing computer code means retrievable from the computer-readable storage medium and executable by a computer system for computing orientation alignment transfer tool location, the computer-readable storage medium comprising:
first computer program code means for automatically determining orientation of at least one aerodynamically significant feature of an as-built airplane;
second computer program code means for automatically determining orientation of an orientation monument for the as-built airplane from the determined orientation of the at least one aerodynamically significant feature of the as-built airplane;
third computer program code means for predicting cruise orientation for the as-built airplane from the orientation of the at least one aerodynamically significant feature in the as-built airplane; and
fourth computer program code means for automatically computing orientation of the orientation monument for the as-built airplane from the predicted cruise orientation for the as-built airplane; and
fifth computer program code means for automatically determining motion to align an orientation alignment transfer tool with the determined orientation of the orientation monument.

21. The computer-readable storage medium of claim 20, wherein:
the at least one aerodynamically significant feature is part of at least one component of the as-built airplane; and
the first computer program code means includes:
sixth computer program code means for automatically computing orientation of the at least one aerodynamically significant feature with respect to its respective component; and
seventh computer program code means for automatically computing orientation of the at least one aerodynamically significant feature in the as-built airplane.

22. The computer-readable storage medium of claim 21, wherein the sixth computer program code means includes:
eighth computer program code means for automatically computing nominal location of the at least one aerodynamically significant feature with respect to assembly interfaces of the component from predetermined as-built locations of a plurality of points of the at least one aerodynamically significant feature and from measured locations of the plurality of points of the at least one aerodynamically significant feature.

23. The computer-readable storage medium of claim 22, wherein the seventh computer program code means includes:
ninth computer program code means for automatically computing motion of the at least one component with at least one aerodynamically significant feature from initial location of the at least one component with at least one aerodynamically significant feature to final orientation in the as-built airplane of the at least one component with at least one aerodynamically significant feature; and
tenth computer program code means for automatically applying to the at least one aerodynamically significant feature the motion computed for the at least one component with at least one aerodynamically significant feature.

24. The computer-readable storage medium claim 20, wherein the fourth computer program code means includes:
eleventh computer program code means for reversing rotation of the predicted cruise orientation; and
twelfth computer program code means for adding orientation angles of a section of the as-built airplane in which the orientation monument is to be installed.

25. The computer-readable storage medium of claim 20, wherein the fifth computer program code means includes:
thirteenth computer program code means for automatically determining initial orientation of the orientation alignment transfer tool;
fourteenth computer program code means for automatically determining a displacement between the initial orientation of the orientation alignment transfer tool and the determined orientation of the orientation monument; and
fifteenth computer program code means for automatically determining motion of the orientation alignment transfer tool to achieve the displacement.

* * * * *